(12) United States Patent
Rosen et al.

(10) Patent No.: US 11,054,095 B2
(45) Date of Patent: *Jul. 6, 2021

(54) LIGHTING DRYWALL

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,434

(22) Filed: Apr. 23, 2020

(65) Prior Publication Data

US 2020/0248881 A1    Aug. 6, 2020

Related U.S. Application Data

(63) Continuation of application No. 16/130,720, filed on Sep. 13, 2018, now Pat. No. 10,677,402.

(Continued)

(51) Int. Cl.
*F21S 8/00* (2006.01)
*F21V 21/096* (2006.01)
(Continued)

(52) U.S. Cl.
CPC ............ *F21S 8/033* (2013.01); *F21V 21/096* (2013.01); *H02J 50/10* (2016.02); *E04B 2/723* (2013.01);
(Continued)

(58) Field of Classification Search
CPC ...... F21S 8/033; F21V 21/096; F21V 33/006; H02J 50/10; E04B 2/723; H04B 5/0037;
(Continued)

(56) References Cited

U.S. PATENT DOCUMENTS 6,147,624 A    11/2000  Clapper
6,236,303 B1    5/2001  Wagner et al.
(Continued)

FOREIGN PATENT DOCUMENTS

CN    105371177 A    3/2016

OTHER PUBLICATIONS

Non-Final Office Action received for U.S. Appl. No. 16/044,047 dated Dec. 26, 2018, 22 pages.
(Continued)

*Primary Examiner* — Peggy A Neils
(74) *Attorney, Agent, or Firm* — Amin, Turocy & Watson, LLP

(57) ABSTRACT

Techniques for smart light and lighting drywall are provided. A system and/or method can comprise a smart light comprising at least one light bulb; and a lighting drywall comprising: a power source; a mesh configured to provide power from the power source using a wireless power transfer mechanism; wherein the smart light is removably attachable to a plurality of locations on the lighting drywall and configured to receive the power using the wireless power transfer mechanism at respective locations of the plurality of locations.

20 Claims, 26 Drawing Sheets

Related U.S. Application Data

(60) Provisional application No. 62/568,294, filed on Oct. 4, 2017, provisional application No. 62/647,232, filed on Mar. 23, 2018.

(51) Int. Cl.
  *H02J 50/10* (2016.01)
  *E04B 2/72* (2006.01)
  *E04B 5/00* (2006.01)
  *H04B 5/00* (2006.01)
  *H01F 38/14* (2006.01)
  *F21Y 115/10* (2016.01)

(52) U.S. Cl.
  CPC .......... *F21Y 2115/10* (2016.08); *H01F 38/14* (2013.01); *H04B 5/0037* (2013.01)

(58) Field of Classification Search
  CPC ... H04B 5/0012; H01F 38/14; F21Y 2115/10; F21Y 2105/16; F21W 2131/00
  See application file for complete search history.

(56) References Cited

U.S. PATENT DOCUMENTS

| | | |
|---|---|---|
| 6,946,974 B1 | 9/2005 | Racunas Jr. |
| 7,026,954 B2 | 4/2006 | Slemmer et al. |
| 7,824,065 B2 | 11/2010 | Maxik |
| 8,280,558 B2 | 10/2012 | Picco |
| 8,283,812 B2 | 10/2012 | Azancot et al. |
| 8,362,713 B2 | 1/2013 | Recker et al. |
| 8,600,786 B2 | 12/2013 | Stefik et al. |
| 8,674,616 B2 * | 3/2014 | Holman ................. F21S 8/026 315/224 |
| 9,367,050 B2 | 6/2016 | Jain et al. |
| 9,560,388 B2 | 1/2017 | Ogle et al. |
| 9,594,956 B2 | 3/2017 | Cohen et al. |
| 9,595,193 B1 | 3/2017 | Duale et al. |
| 9,601,018 B2 | 3/2017 | Cogill et al. |
| 9,644,799 B2 | 5/2017 | Crayford et al. |
| 9,893,551 B2 * | 2/2018 | Cheatham, III ........ H02J 50/30 |
| 10,210,355 B1 * | 2/2019 | Lai ..................... H04N 5/23203 |
| 10,251,242 B1 | 4/2019 | Rosen et al. |
| 10,677,402 B2 * | 6/2020 | Rosen ................... F21V 21/096 |
| 2002/0171562 A1 | 11/2002 | Muraki |
| 2004/0022058 A1 * | 2/2004 | Birrell .................... H05B 45/37 362/249.01 |
| 2005/0128751 A1 | 6/2005 | Roberge et al. |
| 2005/0248299 A1 | 11/2005 | Chemel et al. |
| 2006/0197684 A1 | 9/2006 | Tremblay |
| 2008/0191009 A1 | 8/2008 | Gressel et al. |
| 2009/0303079 A1 | 12/2009 | Khim |
| 2010/0007525 A1 | 1/2010 | Shanbhag et al. |
| 2010/0060485 A1 | 3/2010 | Kim |
| 2010/0309024 A1 | 12/2010 | Mimeault |
| 2011/0006893 A1 | 1/2011 | Finch et al. |
| 2011/0193872 A1 | 8/2011 | Biemath et al. |
| 2012/0011033 A1 | 1/2012 | Salgia |
| 2012/0066144 A1 | 3/2012 | Berkvens et al. |
| 2012/0092192 A1 | 4/2012 | Wong |
| 2012/0098655 A1 | 4/2012 | Preta et al. |
| 2013/0002587 A1 | 1/2013 | Biggs et al. |
| 2013/0073350 A1 | 3/2013 | Blustein |
| 2013/0113936 A1 | 5/2013 | Cohen et al. |
| 2013/0300911 A1 | 11/2013 | Beckman |
| 2014/0055990 A1 | 2/2014 | Reed |
| 2014/0262057 A1 | 9/2014 | Chambers et al. |
| 2015/0195100 A1 | 7/2015 | Imes et al. |
| 2015/0286938 A1 | 10/2015 | Blair et al. |
| 2016/0047164 A1 | 2/2016 | Lundy et al. |
| 2016/0085884 A1 | 3/2016 | Schafer et al. |
| 2016/0135271 A1 | 3/2016 | Alexander |
| 2016/0104325 A1 | 4/2016 | Lu |
| 2016/0216443 A1 | 7/2016 | Morgan et al. |
| 2016/0359325 A1 | 12/2016 | Kawata et al. |
| 2017/0073074 A1 | 3/2017 | Gagnon et al. |
| 2017/0094756 A1 | 3/2017 | Saffari |
| 2017/0192406 A1 | 7/2017 | Ashdown et al. |
| 2017/0247289 A1 | 8/2017 | Waldschmidt et al. |
| 2017/0322350 A1 | 11/2017 | Montagne |
| 2018/0096634 A1 | 4/2018 | Walker et al. |
| 2018/0156429 A1 | 6/2018 | Cadet et al. |
| 2018/0211503 A1 | 7/2018 | Baliga et al. |
| 2018/0216791 A1 | 8/2018 | Leung et al. |
| 2018/0224596 A1 | 8/2018 | Creasman et al. |
| 2018/0259141 A1 | 9/2018 | Yamaguchi et al. |
| 2018/0313660 A1 | 11/2018 | Eyster et al. |
| 2019/0069379 A1 | 2/2019 | Kastee et al. |
| 2019/0104181 A1 | 4/2019 | Rosen et al. |

OTHER PUBLICATIONS

Notice of Allowance received for U.S. Appl. No. 16/044,073 dated Nov. 08, 2018, 20 pages.
Non-Final Office Action received for U.S. Appl. No. 16/043,974 dated May 2, 2019, 28 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/739,627 dated Feb. 7, 2020, 19 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
U.S. Appl. No. 16/130,720, filed Sep. 13, 2018.
Non-Final Office Action received for U.S. Appl. No. 16/821,007 dated May 1, 2020, 36 pages.
Non-Final Office Action received for U.S. Appl. No. 16/044,027 dated Jun. 22, 2020, 48 pages.
Notice of Allowance received for U.S. Appl. No. 16/043,949 dated May 21, 2020, 49 pages.
Non-Final Office Action received for U.S. Appl. No. 16/043,875 dated May 27, 2020, 15 pages.
Non-Final Office Action received for U.S. Appl. No. 16/043,875 dated Jul. 8, 2020, 36 pages.
Final Office Action received for U.S. Appl. No. 16/044,027 dated Oct. 8, 2020, 29 pages.
Notice of Allowance received for U.S. Appl. No. 16/043,997 dated Aug. 7, 2020, 46 pages.
Final Office Action received for U.S. Appl. No. 16/682,085 dated Oct. 28, 2020, 27 pages.
Final Office Action received for U.S. Appl. No. 16/682,085 dated Oct. 8, 2020, 29 pages.
Final Office Action received for U.S. Appl. No. 16/043,875 dated Jan. 25, 2020, 13 pages.

* cited by examiner

EXAMPLE STANDARD BULB BASE TYPES
SCREW BASES
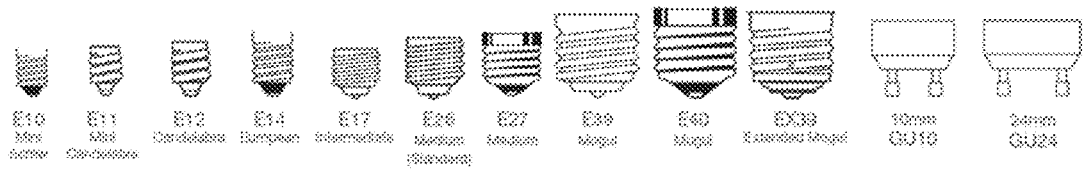
TWIST & LOCK BASES
SPECIALTY BASES
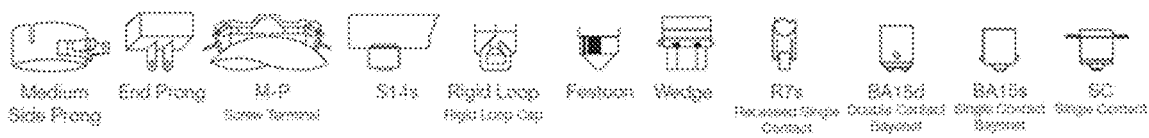
BI PIN BASES
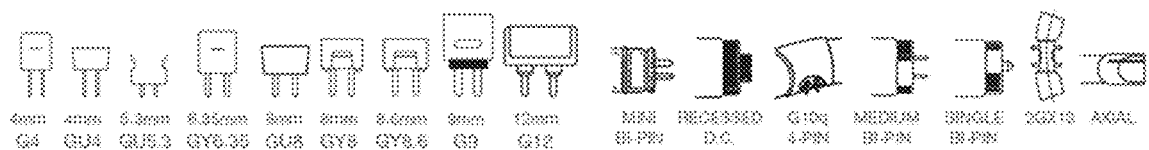
PIN BASES
PLUG IN LAMP BASES
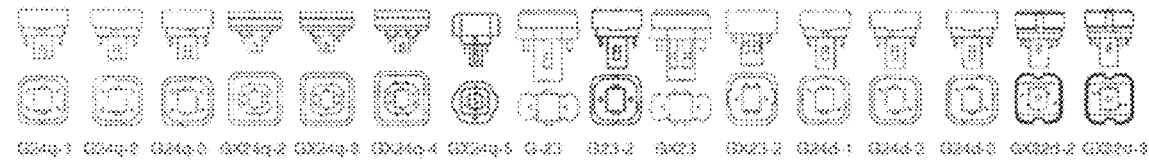
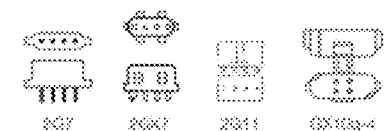
FIG. 3

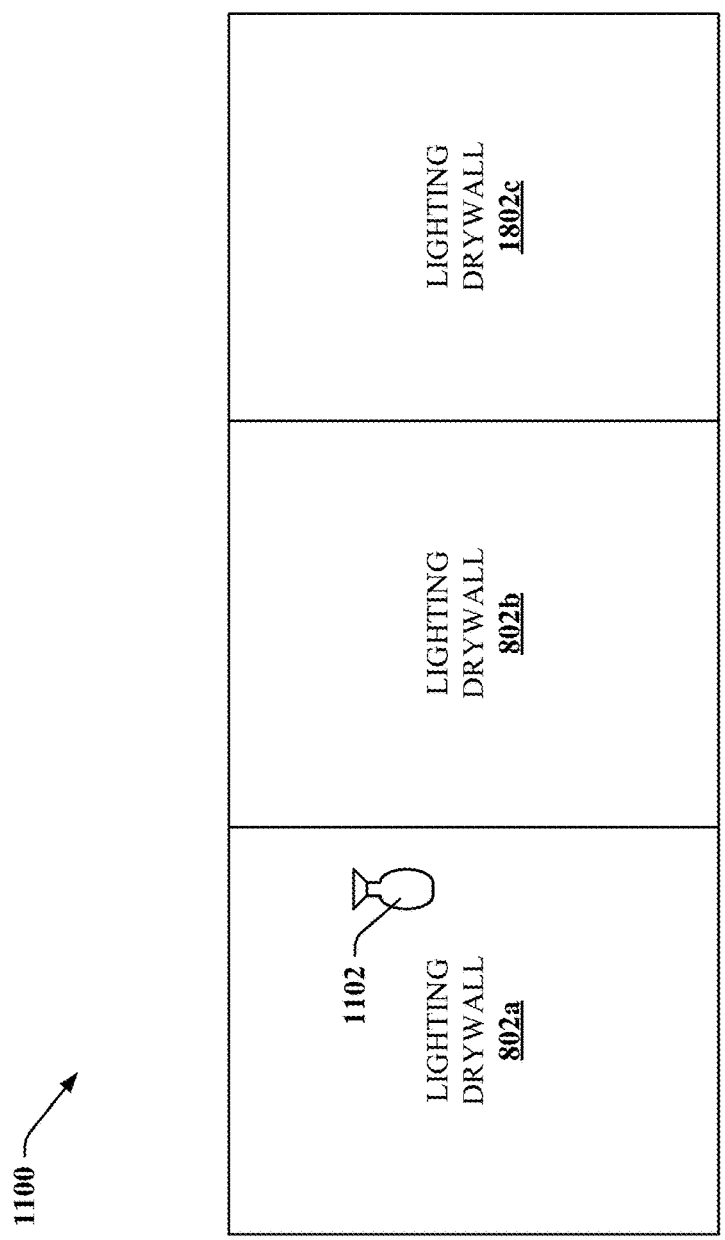

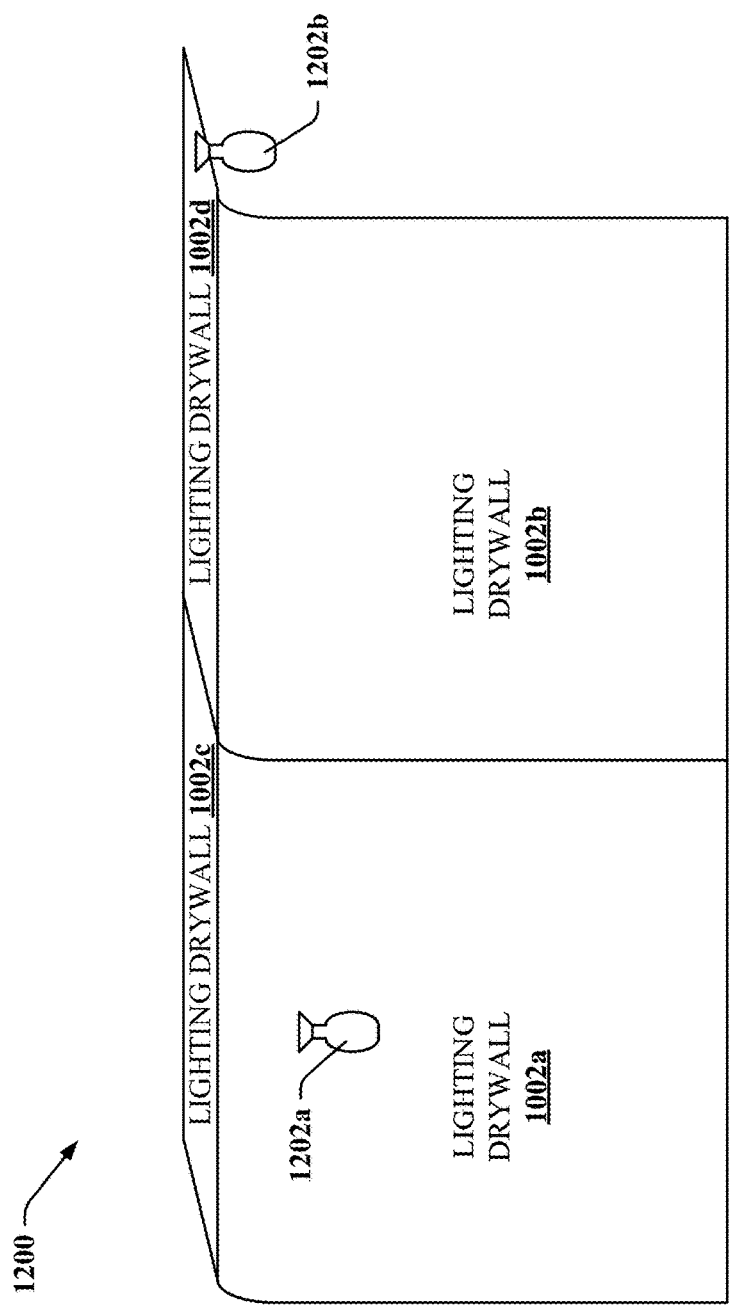

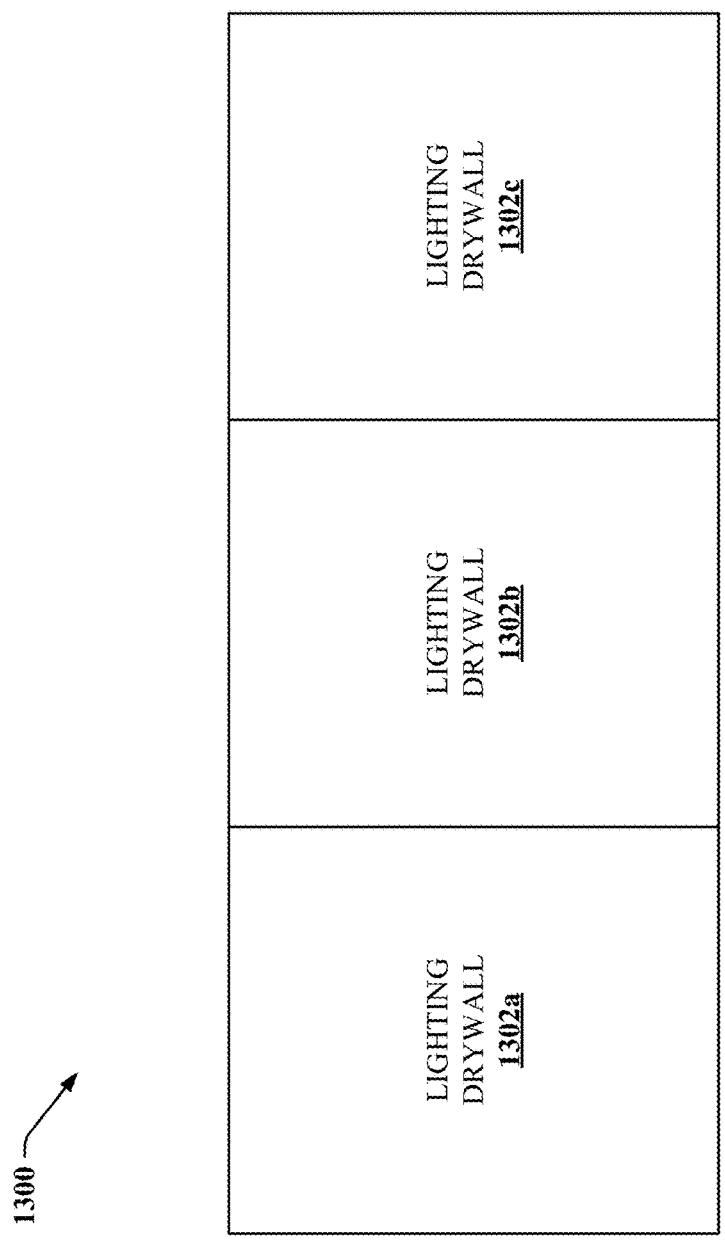

LIGHTING DRYWALL

CROSS-REFERENCE TO RELATED APPLICATIONS

This application is a continuation of, and claims priority to each of, pending U.S. patent application Ser. No. 16/130,720, filed on Sep. 13, 2018, entitled "LIGHTING DRYWALL", which claims the benefit of U.S. Provisional Patent Application Ser. No. 62/647,232 filed on Mar. 23, 2018, entitled "LIGHTING DRYWALL" and claims the benefit of U.S. Provisional Patent Application Ser. No. 62/568,294 filed on Oct. 4, 2017, entitled "SELF AWARE LIGHTS THAT SELF-CONFIGURE." The entireties of the aforementioned applications are incorporated by reference herein.

BACKGROUND

The subject disclosure relates generally to lighting drywall that can power and/or control lights attached to the lighting drywall.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate a smart light and/or lighting drywall performing operations are described.

According to an embodiment, a lighting drywall is provided. The lighting drywall comprises a power source; a mesh configured to provide power from the power source to a device attached to a surface of the lighting drywall using a wireless power transfer mechanism; and at least one connector configured to physically connect to at least one other connector of at least one other lighting drywall and electrically connect the mesh with at least one other mesh of the at least one other lighting drywall to form a continuous mesh.

In another embodiment, a system is provided. The system comprises a smart light comprising at least one light bulb; and a lighting drywall comprising: a power source; a mesh configured to provide power from the power source using a wireless power transfer mechanism; wherein the smart light is removably attachable to a plurality of locations on the lighting drywall and configured to receive the power using the wireless power transfer mechanism at respective locations of the plurality of locations.

In another embodiment, a method comprises: attaching, via a magnetic attachment mechanism, a smart light to a first location on a lighting drywall; powering, via mesh embedded within the lighting drywall, the smart light at the first location using a wireless power transfer mechanism.

DESCRIPTION OF THE DRAWINGS

FIG. 3 illustrates example, non-limiting standard base types for base of smart light bulb in accordance with one or more embodiments described herein.

FIGS. 11A-11C illustrate a block diagram of an example, non-limiting environment in which smart lights and lighting drywalls are installed in accordance with one or more embodiments described herein.

FIG. 12 illustrates a block diagram of an example, non-limiting environment in which smart lights and lighting drywalls are installed in accordance with one or more embodiments described herein.

FIGS. 13A-13E illustrate a block diagram of an example, non-limiting environment in which lighting drywalls are installed in accordance with one or more embodiments described herein.

DETAILED DESCRIPTION

Figure 1:
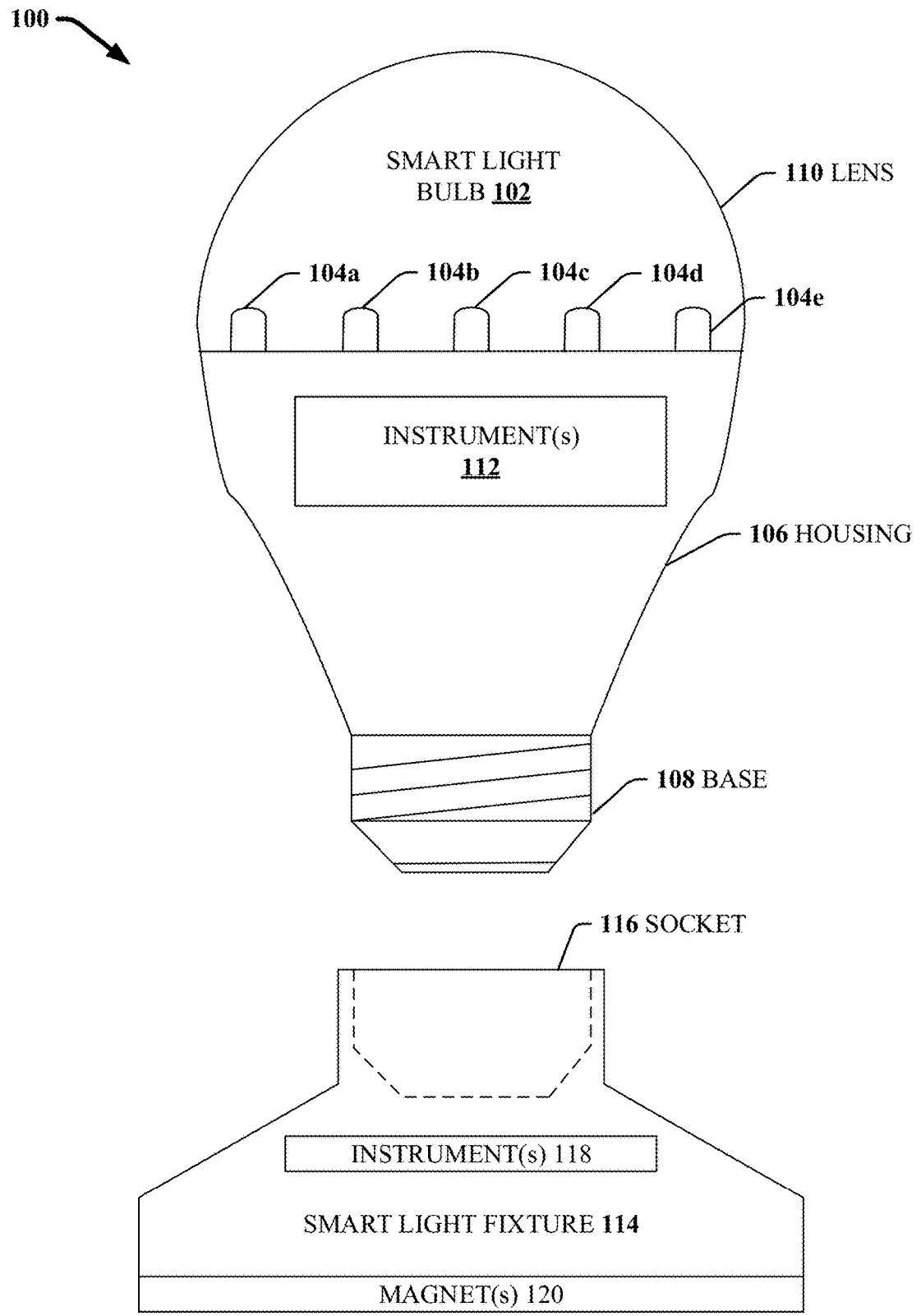
FIG. 1 illustrates a block diagram of an example, non-limiting smart light in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Conventionally, if a person wants to install lighting fixtures in the home, they install them in already existing fixture locations as a retrofit, or they need to run power to a new location for the lighting fixture. This can be very costly. Additionally, it is difficult/expensive to undo or to relocate if they are not happy with lighting results.

There is a need for a reconfigurable lighting system that is able to be more easily installed and adjusted.

In accordance with various disclosed aspects, a lighting drywall is presented. The lighting drywall can comprise a drywall sheet that has embedded therein a mesh that is capable of powering lights (and other appliances) through wireless power transfer mechanisms, non-limiting examples of which can include non-radiative power transfer, radiative power transfer, magnetic induction, capacitive coupling, electromagnetic radiation, time varying electric fields, magnetic fields, radio waves, microwaves, and infrared. The lighting drywall sheets can snap together to connect their meshes when installed in walls, ceilings, and/or floors, such that the meshes form a continuous electrically conductive mesh. Additionally, the lighting drywall can have an array of magnets embedded throughout the sheet or can have one or more surfaces to which a magnetically attachable light can attach thereon.

It is to be appreciated that the lighting drywall can be an alternative or retrofit for any application where drywall is currently used. Additionally, the lighting drywall can be flexible and shaped to meet any contouring needs.

Furthermore, a light is presented that can have magnets embedded therein can be easily attached to any location on the lighting drywall and be held in place by the magnets or surface of the lighting drywall at the location. In another example, the light can have an adhesive that allows for attachment, removal, and reattachment to the lighting drywall without causing damage to a surface of the lighting drywall. Furthermore, the light can be powered by the mesh in the lighting drywall. For example, LED lights can use low power and still provide significant light output\. The LED lights can be supplied power through the wireless power transfer mechanism of the mesh in the lighting drywall.

In another example, the lighting drywall can have a surface that is a LED panel that is powered/controlled by the mesh. In this manner, light can be projected from any portion of the sheet as needed based on artificial intelligence control or user control. For example, as a person is walking light projected from the walls, ceilings, and/or floors can move with the user to keep a pathway in front of and/or around the user lit. In another aspect, in a room, different portions of the walls, ceilings, and/or floors can project different lighting based on different context/activities occurring in corresponding portions of the room. In a further aspect, a portion of a lighting drywall in a room can display media content, while the remainder of the walls, ceilings, and/or floors project lighting coordinated with the media.

In an additional example, lighting drywall can have one or more laser LEDs embedded therein and have a surface that acts as an optical waveguide for light projected from the one or more laser LEDs. A laser LED can have a very high light output such that a single laser LED can cause the entire lighting drywall surface to project light through the optical waveguide surface.

FIG. 1 illustrates a block diagram of an example, non-limiting smart light 100 in accordance with one or more embodiments described herein. Smart lights 100 described herein can be employed that are communicating with each other, communicating with lighting drywall, and/or communicating with another device. Smart lights 100 can coordinate amongst themselves to make decisions regarding actions to be taken by the smart lights 100. Smart light 100 can receive instructions from lighting drywall, and/or communicate with another device, regarding actions to be taken by the smart light 100. Smart light 100 can receive instructions from an operator, regarding actions to be taken by the smart light 100. A smart light 100 can autonomously make decisions regarding actions to be taken by the smart light 100. It is to be appreciated that smart lights 100 can employ any of the aforementioned decision-making methods, alone or in combination, regarding actions to be taken by the smart lights 100.

Smart light 100 comprises a smart light bulb 102 which can be installed into a socket 116 of smart light fixture 114. Smart light bulb 102 can comprise one or more light emitting devices 104a, 104b, 104c, 104d, and 104e (e.g. light emitting diode (LED), organic light emitting diode (OLED), filament, quantum dot, incandescent, high-intensity discharge (HID), neon, fluorescent, compact fluorescent (CFL), electroluminescent (EL), laser, or any other suitable light emitting device) a housing 106, a base 108, a lens 110, and one or more instruments 112. It is to be appreciated that while five light emitting devices 104a, 104b, 104c, 104d, and 104e are depicted for illustrative purposes only, smart light bulb 102 can include any suitable number of light emitting devices. It is also to be appreciated that smart light bulb 102 can include other components (not shown) or exclude one or more components. For example, smart light bulb 102 can exclude lens 110. In another example, smart light bulb 102 can include one or more reflectors, one or more shades, one or more positioning motors, or any other suitable components needed according to functionality described herein.

Smart light fixture 114 can comprise one or more magnets 120 and one or more instruments 118. It is to be appreciated that smart light fixture 114 can include other components (not shown) or exclude one or more components. For example, smart light fixture 114 can include one or more light emitting devices, one or more reflectors, one or more shades, one or more positioning motors, or any other suitable components needed according to functionality described herein. It is to be appreciated that smart light bulb 102 can communicate with smart light fixture 114 via wired or wireless communications. For example, base 108 connecting to socket 116 can form a wired communication connection.

While FIG. 1 depicts a smart light bulb 102 fitting into a smart light fixture 114 it is to be appreciated that a single smart light fixture 114 can comprise a plurality of sockets 116 for installation of a plurality of smart light bulbs 102.

Figure 2:
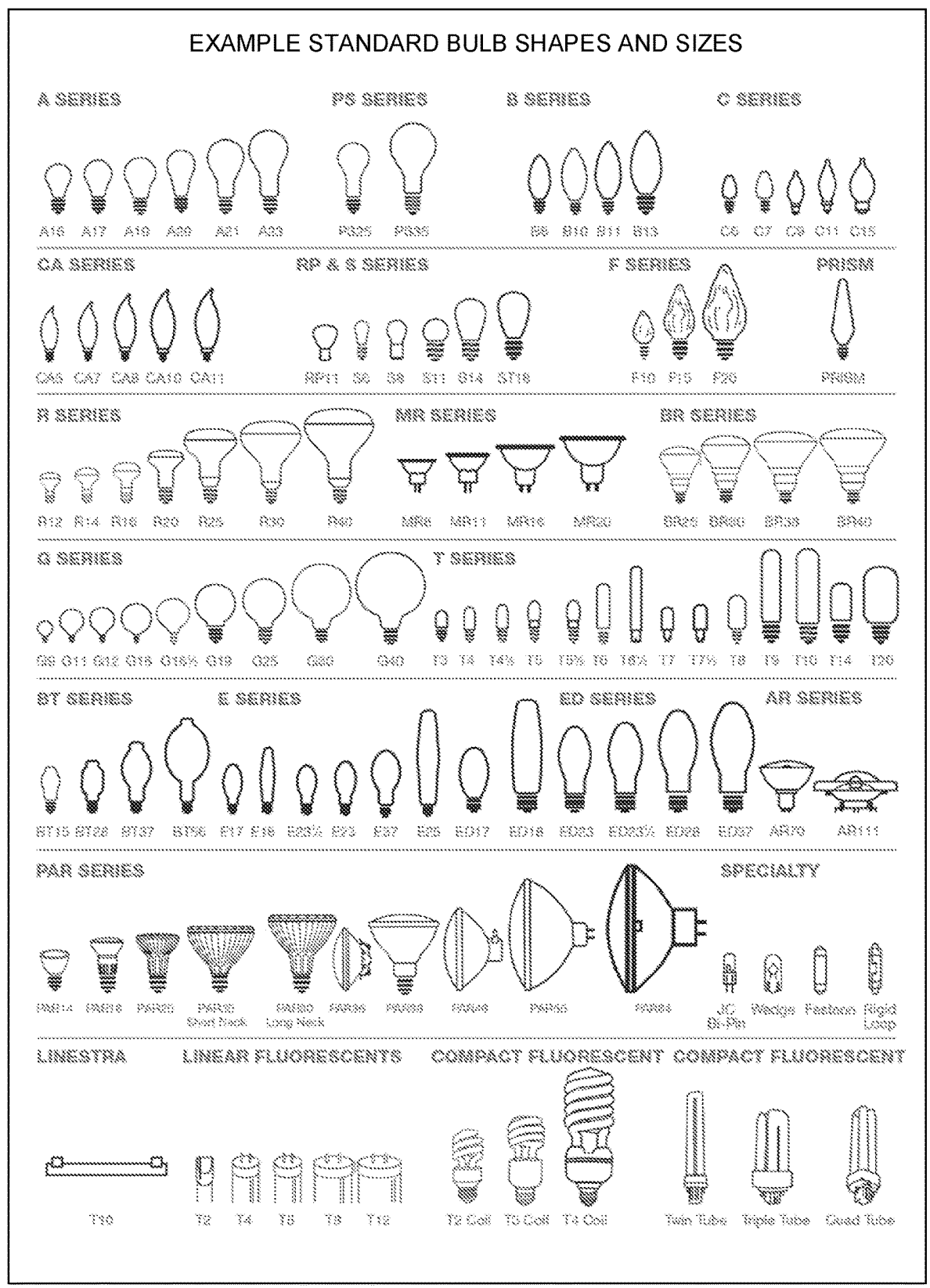
FIG. 2 illustrates example, non-limiting standard bulb shapes and size for smart light bulb in accordance with one or more embodiments described herein.

FIG. 2 illustrates example, non-limiting standard bulb shapes and size for smart light bulb 102. It is to be appreciated that smart light bulb 102 can be customized to be in any suitable shape and any suitable size for an application in which smart light bulb 102 is to be installed.

FIG. 3 illustrates example, non-limiting standard base types for base 108. It is to be appreciated that base 108 can be customized to be in any suitable form for an application in which smart light bulb 102 is to be installed. Likewise, socket 116 can be customized to be compatible with base 108. Additionally, smart light fixture 114 can be customized to be in any suitable form for an application in which smart light 100 is to be installed.

Figure 4:
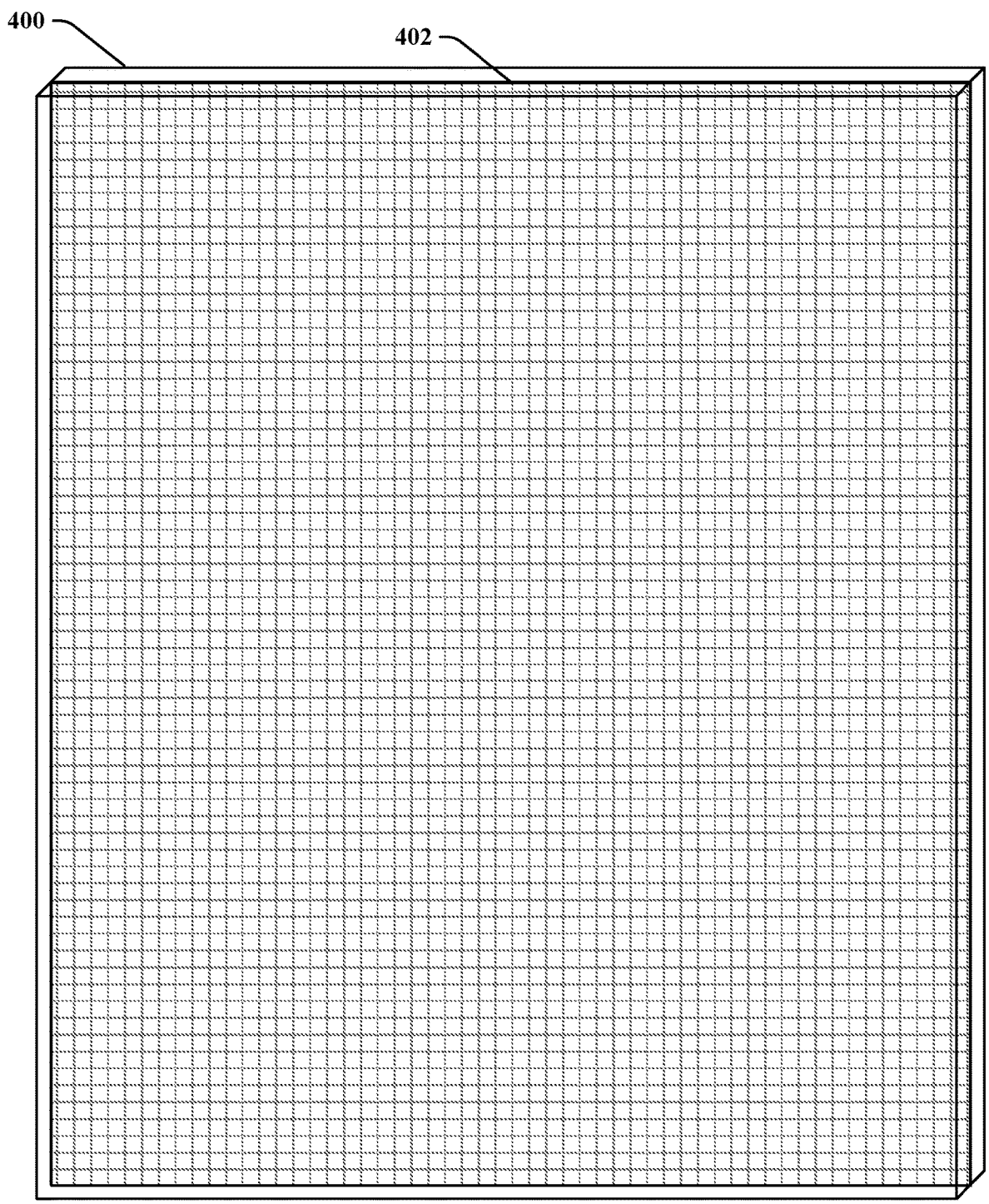
FIG. 4 illustrates a block diagram of an example, non-limiting lighting drywall in accordance with one or more embodiments described herein.

FIG. 4 illustrates a block diagram perspective view of an example, non-limiting lighting drywall 400 in accordance with one or more embodiments described herein. Lighting drywalls 400 described herein can be employed that are communicating with each other, communicating with smart light 100, and/or communicating with another device. Lighting drywalls 400 can coordinate amongst themselves to make decisions regarding actions to be taken by the lighting drywalls 400. Lighting drywall 400 can receive instructions from smart light 100, and/or communicate with another device, regarding actions to be taken by the lighting drywall 400. Lighting drywall 400 can receive instructions from an operator, regarding actions to be taken by the lighting drywall 400. A lighting drywall 400 can autonomously make decisions regarding actions to be taken by the lighting drywall 400. It is to be appreciated that lighting drywalls 400 can employ any of the aforementioned decision-making methods, alone or in combination, regarding actions to be taken by the lighting drywalls 400.

Lighting drywall 400 can have embedded therein a mesh 402 that is capable of powering smart lights 100 (and other appliances) through wireless power transfer mechanisms, non-limiting examples of which can include non-radiative power transfer, radiative power transfer, magnetic induction, capacitive coupling, electromagnetic radiation, time varying electric fields, magnetic fields, radio waves, microwaves, and infrared.

Figure 5:
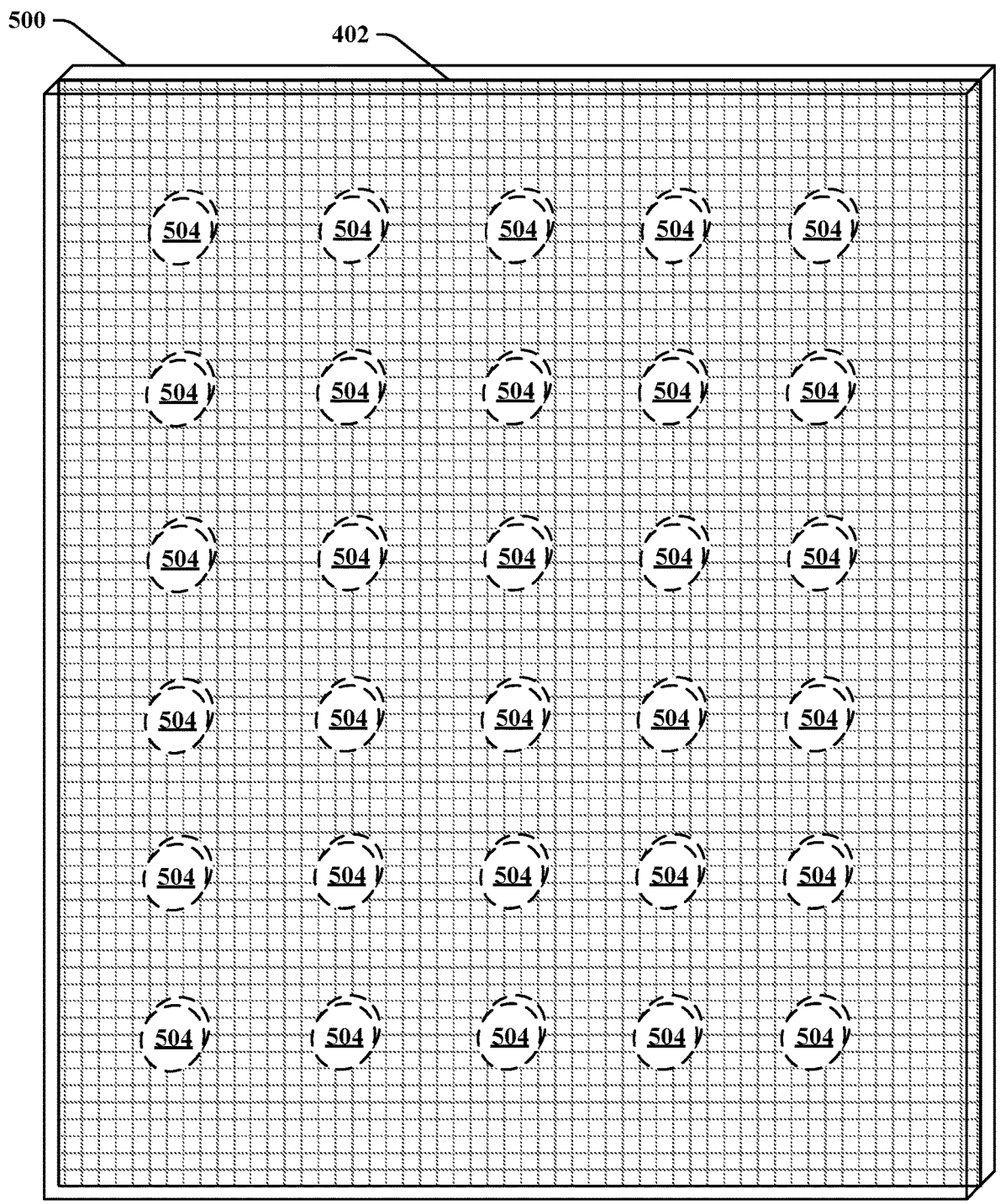
FIG. 5 illustrates a block diagram of an example, non-limiting lighting drywall in accordance with one or more embodiments described herein.

FIG. 5 illustrates a block diagram perspective view of an example, non-limiting lighting drywall 500 in accordance with one or more embodiments described herein. Lighting drywall 500 can be lighting drywall 400 with the addition of magnets 504 embedded within lighting drywall 500. Magnets 504 enable smart light 100 to attached to lighting drywall 500 at various positions associated with the locations of magnets 504 through magnetic attraction to magnets 120 of smart light 100. While 30 magnets 504 are depicted in this example, it is to be appreciated that any suitable number of magnets 504 can embedded at any suitable positions within lighting drywall 500 to provide suitable locations where one or more smart lights 100 can be attached to lighting drywall 500. In another example (not shown), lighting drywall 500 can have one or more surfaces to which enable magnets 120 to attach smart light 100 to the surface of lighting drywall 500 through magnetic attraction. Employing magnetic attraction as the mechanism for attaching smart light 100 to lighting drywall 500 allows for easy attachment and detachment, thus providing for the ability to easily move smart light 100 to different location on lighting drywall 500.

Figure 6:
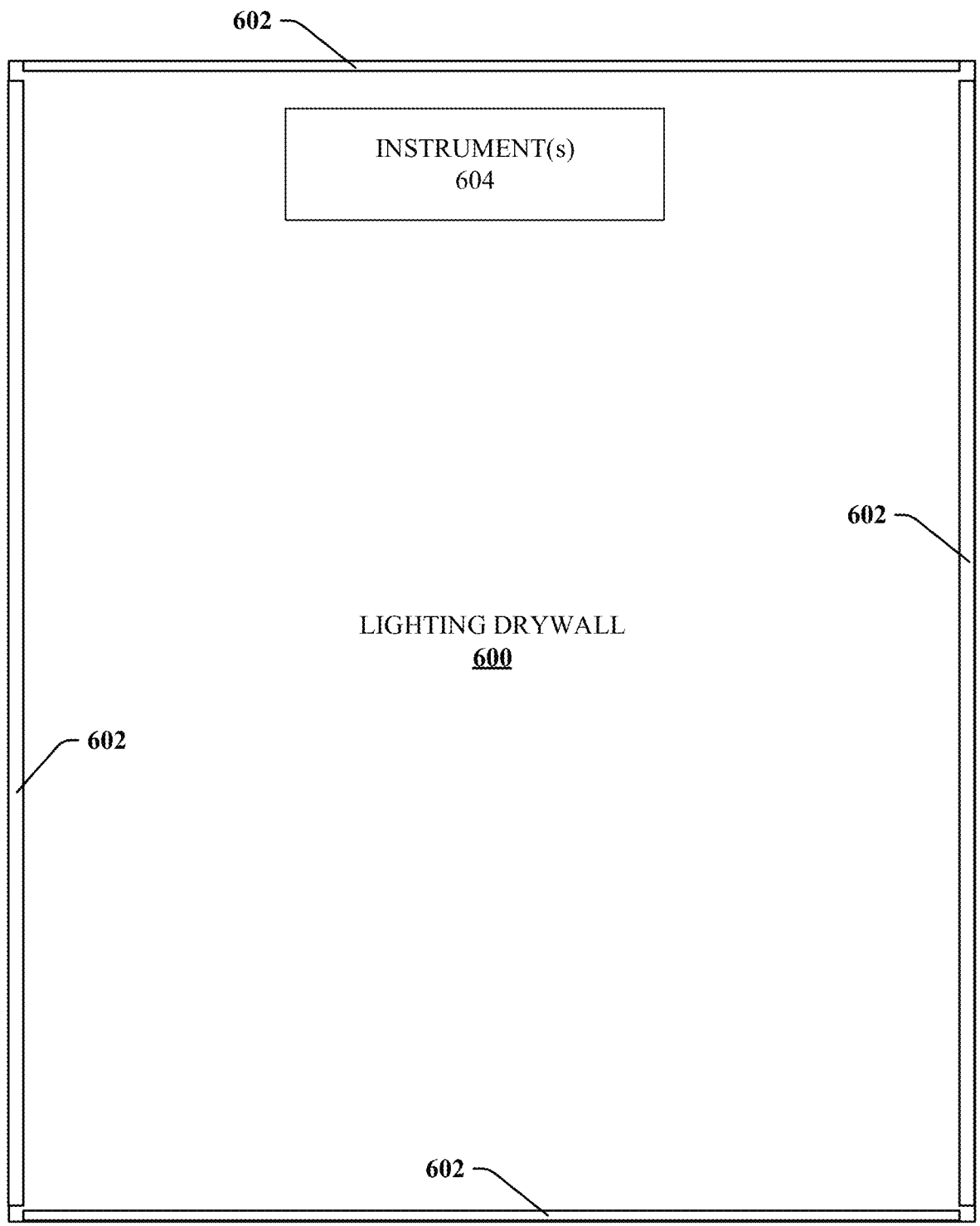
FIG. 6 illustrates a block diagram of an example, non-limiting lighting drywall in accordance with one or more embodiments described herein.

FIG. 6 illustrates a block diagram view of an example, non-limiting lighting drywall 600 in accordance with one or more embodiments described herein. Lighting drywall 600 can be lighting drywall 400 or 500 with the addition of connectors 602 embedded within lighting drywall 400 or 500. Furthermore, lighting drywall 600 can include instruments 604. Connecters 602 allow lighting drywalls 600 to snap together to connect their meshes 402 when installed, such as in walls, ceilings, and/or floors, such that the meshes 402 form a continuous electrically conductive mesh. Furthermore, mesh 402 can form a communication bus within and between lighting drywalls 600. It is to be appreciated that connecters 602 can be any suitable type of connector that allows for physical attachment of lighting drywalls 600 to each other, and provides for the functional connection of meshes 402 between lighting drywalls 600. For example, connecters 602 can provide for power and/or communication connection between lighting drywalls 600.

In another aspect, the connectors 602 and meshes 402 can be made such that they can continue to function when lighting drywall 600 is shaped (e.g. curved, bent, folded, etc.) and/or cut to meet installation requirements.

A lighting drywall 400, 500, 600 can include a power source, non-limiting examples of which include electrical grid power, battery, electrochemical cell, fuel cell, natural gas generated electric power, compressed air generated electric power, diesel fuel generated electric power, gasoline generated electric power, oil generated electric power, propane generated electric power, nuclear power system, solar power system, wind power system, piezoelectric power system, micro-electrical mechanical systems (MEMS)-generated electric power, inductive power system, radio-frequency power system, wireless power transfer mechanism, or any other suitable power source. In an example, a lighting drywall 400, 500, 600 can have a constantly available power source, such as that provided by an electrical power grid. In another example, a lighting drywall 400, 500, 600 can have a temporary power source, such as a battery (e.g. disposable battery or rechargeable battery). In a further example, a lighting drywall 400, 500, 600 can generate and store its own power, such as by solar, fuel cell, radio-frequency harvesting, induction, piezoelectric, electro-mechanical, chemical, nuclear, carbon based-fuel, or any other suitable self-generating power source. It is to be appreciated that lighting drywall 400, 500, 600 can have a plurality of different power sources, with one or more power sources acting as a backup for another power source. It is to be appreciated that lighting drywall 400, 500, 600 can have configurable power sources. For example, lighting drywall 400, 500, 600 can have a modular configuration that allows for one or more power sources to be added or removed by a manufacturer or operator.

A smart light 100 can receive power from lighting drywall 400, 500, 600 using wireless power transfer mechanisms, non-limiting examples of which can include non-radiative power transfer, radiative power transfer, magnetic induction, capacitive coupling, electromagnetic radiation, time varying electric fields, magnetic fields, radio waves, microwaves, and infrared. It is to be appreciated that smart light 100 and lighting drywall 400, 500, 600 can include components (not shown) to enable wireless power transfer mechanisms. A smart light 100 can also include a backup power source, such as a battery (e.g. disposable battery or rechargeable battery). For example, a rechargeable battery in smart light 100 can be charged using power received from the wireless power transfer mechanism.

A smart light 100 and/or lighting drywall 400, 500, 600 can include one or more computers, one or more processors, one or more memories, and one or more programs. A smart light 100 and/or lighting drywall 400, 500, 600 can communicate via any suitable form of wireless or wired communication using a communication device. Non-limiting examples of wireless communication can include radio communication, optical communication, sonic communication, electromagnetic induction communication, or any other suitable wireless communication.

A smart light 100 and/or lighting drywall 400, 500, 600 can include one or more instruments 112, 118, 604, non-limiting examples of which include a communication device, a radio frequency identification (RFID) reader, a navigation device, a camera, a video camera, a three-dimensional camera, a global positioning system (GPS) device, a motion sensor, a radar device, a temperature sensor, a weather sensor, a humidity sensor, a barometer, a Doppler radar, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a touch sensor, a gyroscope, an altimeter, a microscope, magnetometer, a device capable is seeing through or inside of objects, or any other suitable sensors. In addition, instruments 112, 118, 604 can include tools, non-limiting examples of which include, a projectile launcher, a liquid sprayer, an air blower, a flame thrower, a heat projector, a cold projector, a scent projector, a chemical projector, an electric discharge device, a fire extinguisher, a laser, or any other suitable tools to perform any task. Additionally, instruments 112, 118, 604 can include a display screen, a video projector, an audio speaker, or any other suitable instrument. It is to be appreciated that smart light 100 and/or lighting drywall 400, 500, 600 can have configurable instruments. For example, smart light 100 and/or lighting drywall 400, 500, 600 can have a modular configuration that allows for one or more instruments to be added or removed by a manufacturer or operator.

A smart light 100 and/or lighting drywall 400, 500, 600 can be constructed out of any suitable material appropriate for environments in which the smart light 100 and/or lighting drywall 400, 500, 600 will operate. A smart light 100 and/or lighting drywall 400, 500, 600 can have suitable protection against an environment in which the smart light 100 and/or lighting drywall 400, 500, 600 will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the smart light 100 and/or lighting drywall 400, 500, 600 will operate. Conventional drywall is limited to certain environments for installation. For example, conventional drywall cannot be used in some environments, such as wet environments, hot environments, chemical environments, environments where objects strike walls, ceilings, and/or floors, or many other environments. In stark contrast, lighting drywall 400, 500, 600 can be made of materials that allow for installation in environments where conventional environments, non-limiting examples of which include wet environments, hot environments, chemical environments, environments where objects strike walls, ceilings, and/or floors, and other suitable environments where conventional drywall cannot be installed. For example, lighting drywall 400, 500, 600 can be installed in a shower, wet sauna, steam room, dry sauna, racquet ball court, outdoors, indoor golf driving range room, indoor batting cage room, indoor tennis practice room, gun shooting range, wind tunnel, underwater, oven room, or any other suitable environment.

Figure 7:
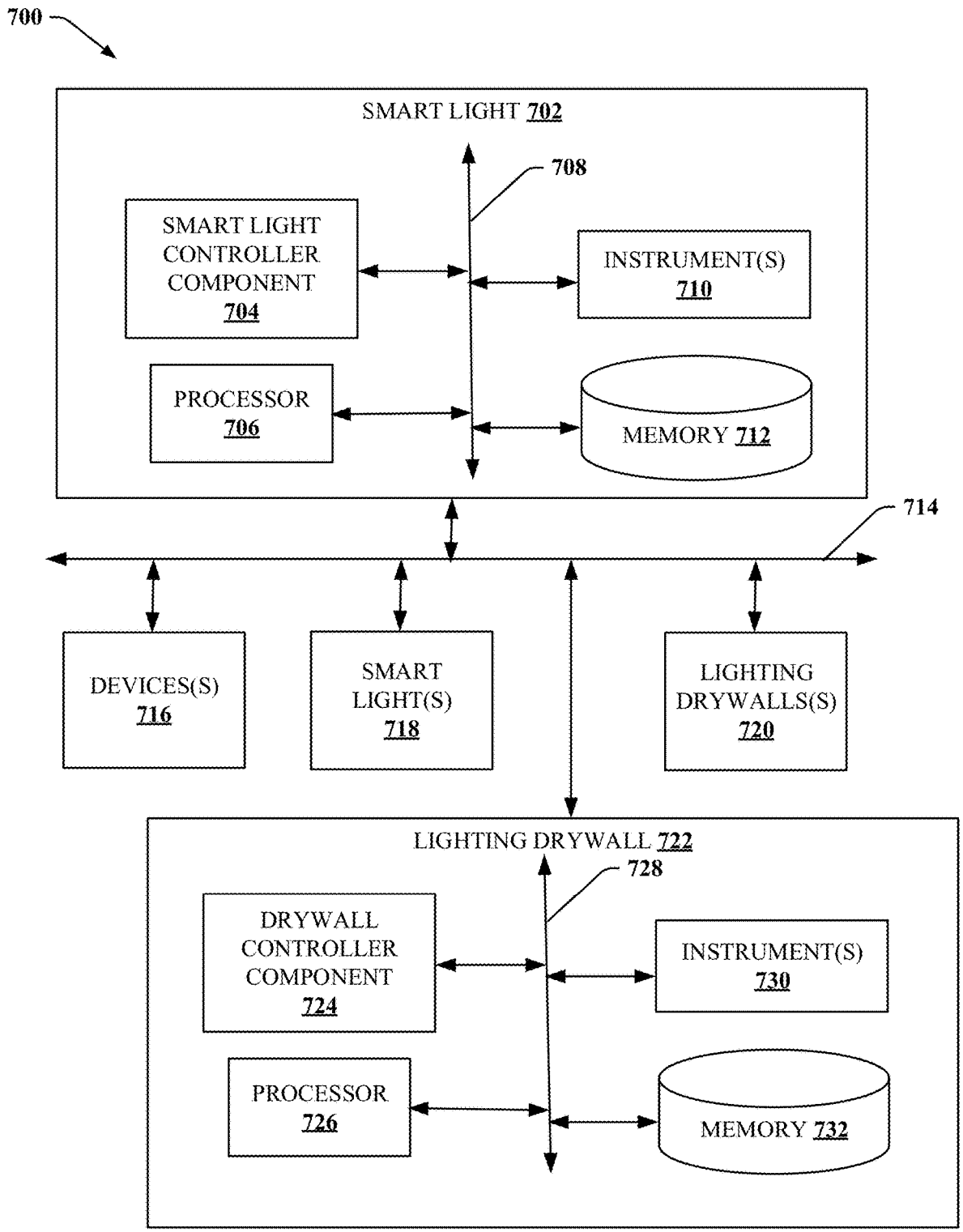
FIG. 7 illustrates a block diagram of an example, non-limiting smart light and lighting drywall in accordance with one or more embodiments described herein.

FIG. 7 illustrates a block diagram of an example, non-limiting system 700 that facilitates a smart light 702, 718 to be installed on a lighting drywall 720, 722 in accordance with one or more embodiments described herein. Repetitive description of like elements employed in other embodiments described herein is omitted for sake of brevity.

In some embodiments, the system 700 facilitates a plurality of smart lights 702, 718 and/or lighting drywalls 720, 722 coordinating together to understand the environment in which the smart lights 702, 718 and/or lighting drywall 720, 722 are installed, determine an objective of the installation, perform a self-configuration according to the determined objective, and operate to achieve the determined objective in accordance with one or more embodiments described herein. Aspects of systems (e.g., system 700 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 7, the system 700 can include smart lights 702, 718, lighting drywalls 720, 722, and one or more devices 716. In various embodiments, smart lights 702, 718 can be or include the structure and/or functionality of one or more of smart lights 100 and/or any other structure and/or functionality described herein for smart lights. In one example, smart light 702 can be a different type of smart light than smart light 718. In another example, a smart light 718 can be a smart light 702 and/or include one or more components of smart light 702. It is to be appreciated that in disclosure herein in which more than one smart light is employed, the smart lights can include one or more smart light 702 and/or one or more smart light 718.

Smart light 702 can include instruments 710, which can include or be one or more of numerous different types of instruments 112, 118 disclosed herein. Smart light 702 can communicate with other smart lights 718, lighting drywalls 720, 722, and devices 716 over one or more networks 714 via wireless and/or wired communications using instruments 710. Smart light 702 can include smart light controller component 704 that can enable smart light 702 to understand the environment in which the smart light 702 is installed, determine an objective of the installation, perform a self-configuration according to the determined objective, and operate to achieve the determined objective.

Smart light 702 can include or otherwise be associated with at least one memory 712 that can store computer executable components (e.g., computer executable components can include, but are not limited to, the smart light controller component 704, and/or associated components) and can store any data generated or obtained by smart light 702 and associated components. Smart light 702 can also include or otherwise be associated with at least one processor 706 that executes the computer executable components stored in the memory 712. Smart light 702 can further include a system bus 708 that can couple the various components including, but not limited to, smart light controller component 704, instruments 710, memory 712, processor 706, and/or other components.

In various embodiments, lighting drywalls 720, 722 can be or include the structure and/or functionality of one or more of lighting drywalls 400, 500, 600 and/or any other structure and/or functionality described herein for lighting drywalls. In one example, lighting drywall 720 can be a different type of lighting drywall than lighting drywall 722. In another example, a lighting drywall 722 can be a lighting drywall 720 and/or include one or more components of lighting drywall 720. It is to be appreciated that in disclosure herein in which more than one lighting drywall is employed, the lighting drywalls can include one or more lighting drywall 720 and/or one or more lighting drywall 722.

Lighting drywall 720 can include instruments 730, which can include or be one or more of numerous different types of instruments 604 disclosed herein. Lighting drywall 720 can communicate with smart lights 702, 718, lighting drywall 722, and devices 716 over one or more networks 714 via wireless and/or wired communications using instruments 730. Lighting drywall 720 can include drywall controller component 724 that can enable lighting drywall 720 to understand the environment in which the lighting drywall 720 is installed, determine an objective of the installation, perform a self-configuration according to the determined objective, and operate to achieve the determined objective.

Lighting drywall 720 can include or otherwise be associated with at least one memory 732 that can store computer executable components (e.g., computer executable components can include, but are not limited to, the drywall controller component 724, and/or associated components) and can store any data generated or obtained by lighting drywall 720 and associated components. Lighting drywall 720 can also include or otherwise be associated with at least one processor 726 that executes the computer executable components stored in the memory 732. Lighting drywall 720 can further include a system bus 728 that can couple the various components including, but not limited to, drywall controller component 724, instruments 730, memory 732, processor 726, and/or other components.

Smart light 702 and/or lighting drywall 720 can include any component and/or functionality of lights as described in U.S. Provisional Application No. 62/568,294 filed Oct. 4, 2017 and titled "SELF AWARE LIGHTS THAT SELF-CONFIGURE", U.S. Provisional Application No. 62/625,417 filed Feb. 2, 2018 and titled "INTELLIGENT HORTICULTURE LIGHT", U.S. Provisional Application No. 62/625,484 filed Feb. 2, 2018 and titled "INTELLIGENT PURIFIER LIGHT", U.S. Provisional Application No. 62/581,914 filed Nov. 6, 2017 and titled "PARKING SPACE LIGHT", U.S. Provisional Application No. 62/632,751 filed Feb. 20, 2018 and titled "HOSPITALITY LIGHT", U.S. Provisional Application No. 62/584,614 filed Nov. 10, 2017 and titled "FLOW MANAGEMENT LIGHT", U.S. Provisional Application No. 62/609,008 filed Dec. 21, 2017 and titled "TECHNIQUES FOR ENHANCED DIFFUSION LIGHTING", U.S. Provisional Application No. 62/636,462 filed Feb. 28, 2018 and titled "INFORMATION AND HUB LIGHTS". The entireties of the aforementioned applications are hereby incorporated herein by reference.

Device 716 can be any electronic device that can electronically interact (e.g. unidirectional interaction or bidirectional interaction) with smart lights 702, 718 and/or lighting drywalls 720, 722, non-limiting examples of which can include a wearable electronic device or a non-wearable electronic device. It is to be appreciated that interaction can include in a non-limiting example, communication, control, physical interaction, or any other suitable interaction between devices. Wearable device can include, for example, heads-up display glasses, a monocle, eyeglasses, contact lens, sunglasses, a headset, a visor, a cap, a mask, a headband, clothing, or any other suitable device that can be worn by a human or non-human user that comprises electronic components. Non-wearable devices can include, for example, a mobile device, a mobile phone, a camera, a camcorder, a video camera, laptop computer, tablet device, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, a washing machine, a dryer, a refrigerator, a dishwashing machine, an oven, a stove, a microwave, a coffee maker, a kitchen appliance, a toy, or any other suitable device. Device 716 can be equipped with a communication device that enables device 716 to communicate with smart lights 702, 718 and/or lighting drywalls 720, 722 over network 714. It is to be appreciated that a device 716 can be employed by an operator to interact with smart lights 702, 718 and/or lighting drywalls 720, 722.

The various components (e.g., smart light controller component 704, drywall controller component 724, instruments 710, 730, memories 712, 732, processors 706, 726, smart lights 702, 718, lighting drywalls 720, 722, and/or other components) of system 700 can be connected either directly or via one or more networks 714. Such networks 714 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Smart light controller component 704 and drywall controller component 724 can interact with each to coordinate actions of smart lights 702, 718 and/or lighting drywalls 720, 722.

Smart light controller component 704 and/or drywall controller component 724 that can facilitate smart light 702 and/or lighting drywall 722 to determine (e.g., ascertain, infer, calculate, predict, prognose, estimate, derive, forecast, detect, and/or compute) characteristics of the environment in which the smart light 702 and/or lighting drywall 722 is installed, determine capabilities of smart light 702 and/or lighting drywall 722, determine one or more objectives of the installation of smart light 702 and/or lighting drywall 722, perform a self-configuration of smart light 702 and/or lighting drywall 722 according to the determined one or more objectives, and determine and execute suitable actions for smart light 702 and/or lighting drywall 722 to perform to achieve the determined one or more objectives in accordance with one or more embodiments described herein. Repetitive description of like elements employed in other embodiments described herein is omitted for sake of brevity.

Smart light controller component 704 and/or drywall controller component 724 can employ one or more instruments 710, 730 to obtain information about the environment in which the smart light 702 and/or lighting drywall 722 is installed and determine characteristics of the environment.

In a non-limiting embodiment, characteristics can include objects, devices, people, flora, fauna, predators, pests, colors, scents, biohazards, chemicals, dimensional characteristics, health status, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable characteristics of the environment that can be determined from information obtained by instruments 710, 730.

It is to be appreciated that smart light controller component 704 and/or drywall controller component 724 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine characteristics based on information obtained by one or more instruments 710, 730.

Smart light controller component 704 and/or drywall controller component 724 can perform a self-examination to determine capabilities of smart light 702 and/or lighting drywall 722. For example, smart light controller component 704 and/or drywall controller component 724 can determine capabilities, such as in a non-limiting example, power sources, computers, processors 706, 726, memories 712, 732, programs, instruments 710, 730, or any other suitable capability of smart light 702 and/or lighting drywall 722. In an example, smart light controller component 704 and/or drywall controller component 724 can probe system bus 708, 728 to determine capabilities of smart light 702 and/or lighting drywall 722. In another example, smart light controller component 704 and/or drywall controller component 724 can examine memory 712, 732 for information on capabilities of smart light 702 and/or lighting drywall 722. In a further example, smart light controller component 704 and/or drywall controller component 724 can obtain information on capabilities of smart light 702 and/or lighting drywall 722 from one or more knowledge sources. It is to be appreciated that smart light controller component 704 and/or drywall controller component 724 can employ any suitable mechanism to determine capabilities of smart light 702 and/or lighting drywall 722.

Smart light controller component 704 and/or drywall controller component 724 can determine one or more objectives of the installation of smart light 702 and/or lighting drywall 722. For example, Smart light controller component 704 and/or drywall controller component 724 can employ artificial intelligence to determine an objective of the installation of smart light 702 and/or lighting drywall 722 based on determined information about the environment and determined capabilities of smart light 702 and/or lighting drywall 722. In a non-limiting example, an objective can be related to safety, automation, control, communication, instruction, entertainment, social enhancement, economics, mood enhancement, activity enhancement, notification, coordination, monitoring, intervention, time management, workflow management, or any other suitable objective. In an example, smart light controller component 704 and/or drywall controller component 724 can select objectives from a library of objectives stored in memory 712, 732 or in one or more knowledges sources. In another example, smart light controller component 704 and/or drywall controller component 724 can create objectives based on artificial intelligence. In a further example, smart light controller component 704 and/or drywall controller component 724 can create linked objectives, wherein one or more objectives depends on one or more other objectives. For example, an objective can become active if another objective is achieved. In another example, an objective can become inactive if another objective is achieved. It is to be appreciated that smart light controller component 704 and/or drywall controller component 724 can employ any suitable mechanism to determine objectives of smart light 702 and/or lighting drywall 722.

Smart light controller component 704 and/or drywall controller component 724 can configure settings of one or more parameters of smart light 702 and/or lighting drywall 722 (e.g., of processors, memory, programs, instruments 710, 730, smart light bulb 102, smart light fixture 114, housing 106, lens 110, light emitting devices, base 108, socket 116, lighting drywall 400, 500, 600, mesh 402, magnets 504, connectors 602, or any other suitable parameters of components of smart light 702 and/or lighting drywall 722) to achieve the one or more objectives.

Smart light controller component 704 and/or drywall controller component 724 can determine and execute suitable actions for smart light 702 and/or lighting drywall 722 to perform to achieve the determined one or more objectives. For example, smart light controller component 704 and/or drywall controller component 724 can employ artificial intelligence to monitor the environment for conditions of the characteristics according to the determined one or more objectives using instruments 710, 730, determine one or more suitable actions for smart light 702 and/or lighting drywall 722 to perform to achieve the determined one or more objectives based on the conditions of the characteristics and the determined capabilities, and execute the one or more suitable actions. In an example, smart light controller component 704 and/or drywall controller component 724 can select actions from a library of actions stored in memory 712, 732 or in one or more knowledges sources. In another example, smart light controller component 704 and/or drywall controller component 724 can create actions to perform based on artificial intelligence.

In another example, an operator can employ a user interface (not shown) of an application on a device 716 to enter information to initiate new actions and/or override actions determined by smart light controller component 704 and/or drywall controller component 724.

Figure 8:
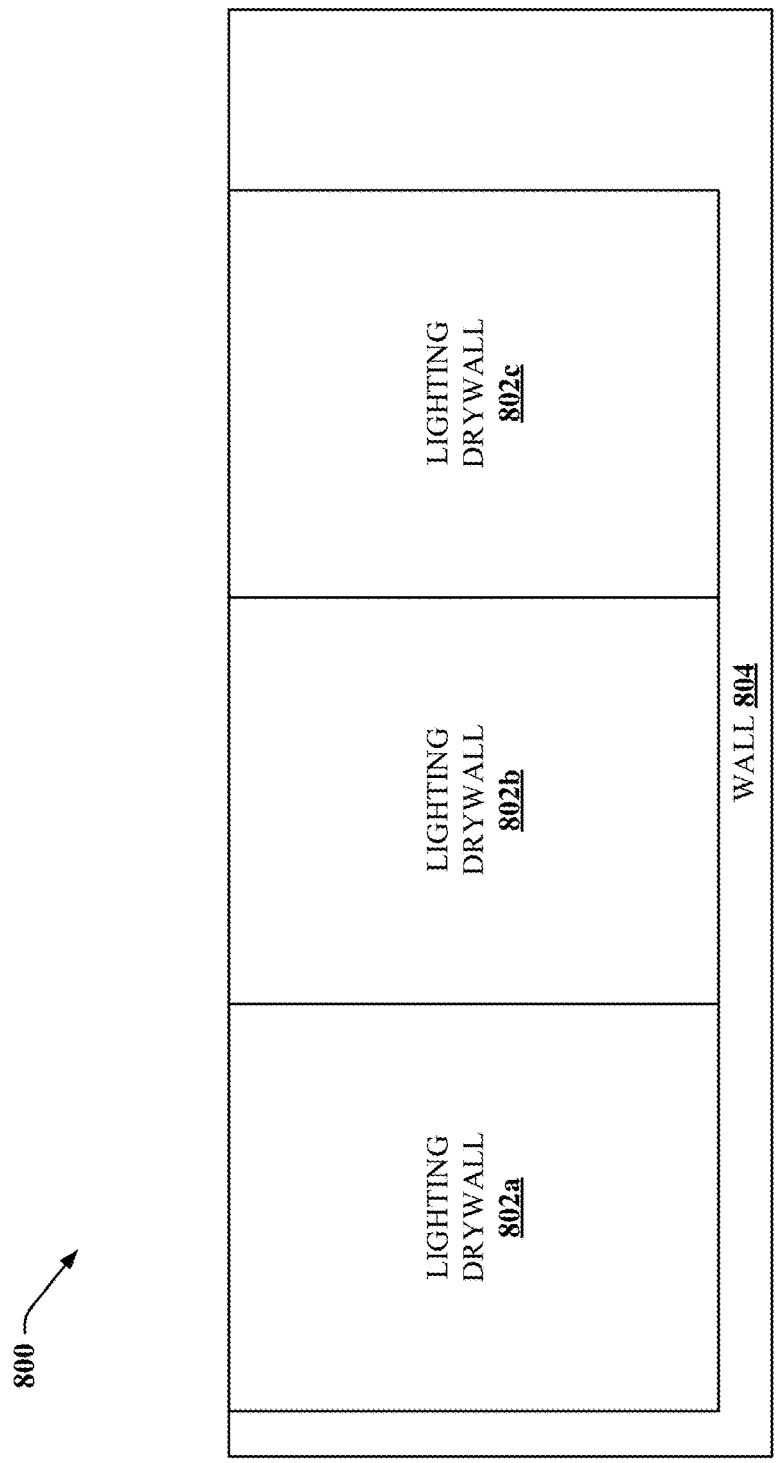
FIG. 8 illustrates a block diagram of an example, non-limiting environment in which lighting drywalls are installed in accordance with one or more embodiments described herein.

FIG. 8 illustrates a block diagram of an example, non-limiting environment 800 which includes lighting drywall is installed in accordance with one or more embodiments described herein. Lighting drywalls 802a, 802b, and 802c can be lighting drywall 720, 722 as described above. Lighting drywalls 802a, 802b, and 802c are installed along a wall 804 with lighting drywall 802a connected via connector 602 to lighting drywall 802b which is connected via connector 602 to lighting drywall 802c. Meshes 402 within lighting drywalls 802a, 802b, and 802 can form a continuous mesh as described above. Lighting drywalls 802a, 802b, and 802c can communicate with each other. One or more drywall controller components 724 of lighting drywalls 802a, 802b, and 802c can control operations of lighting drywalls 802a, 802b, and 802c. For example, some operations of lighting drywalls 802a, 802b, and 802c can be controlled by their respective drywall controller components 724. In another example, a drywall controller component 724 from one of lighting drywalls 802a, 802b, and 802c can operate as a master while the other drywall controller components 724 can operate as slaves to the master.

Figure 9:
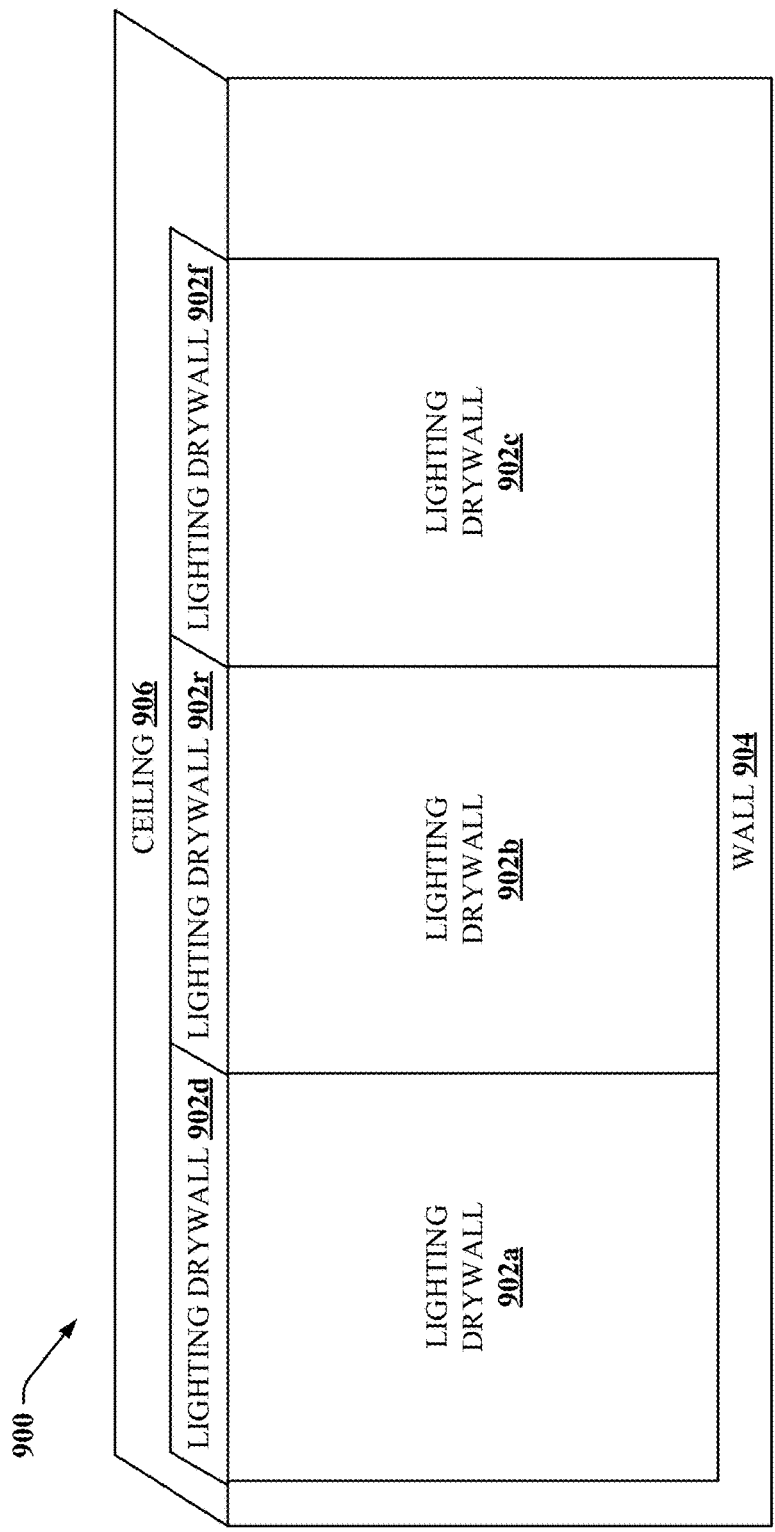
FIG. 9 illustrates a block diagram of an example, non-limiting environment in which lighting drywalls are installed in accordance with one or more embodiments described herein.

FIG. 9 illustrates a block diagram of an example, non-limiting environment 900 which includes lighting drywall is installed in accordance with one or more embodiments described herein. Lighting drywalls 902a, 902b, 902c, 902d, 902e, and 902f can be lighting drywall 720, 722 as described above. Lighting drywalls 902a, 902b, and 902c are installed along a wall 904 while lighting drywalls 902d, 902e, and 902f are installed on a ceiling 906. In this example, lighting drywalls 902a, 902b, 902c, 902d, 902e, and 902f are installed as flat sheets. Lighting drywalls 902a, 902b, 902c, 902d, 902e, and 902f are connected via connectors 602 such that meshes 402 within lighting drywalls 902a, 902b, 902c, 902d, 902e, and 902f can form a continuous mesh as described above.

Figure 10:
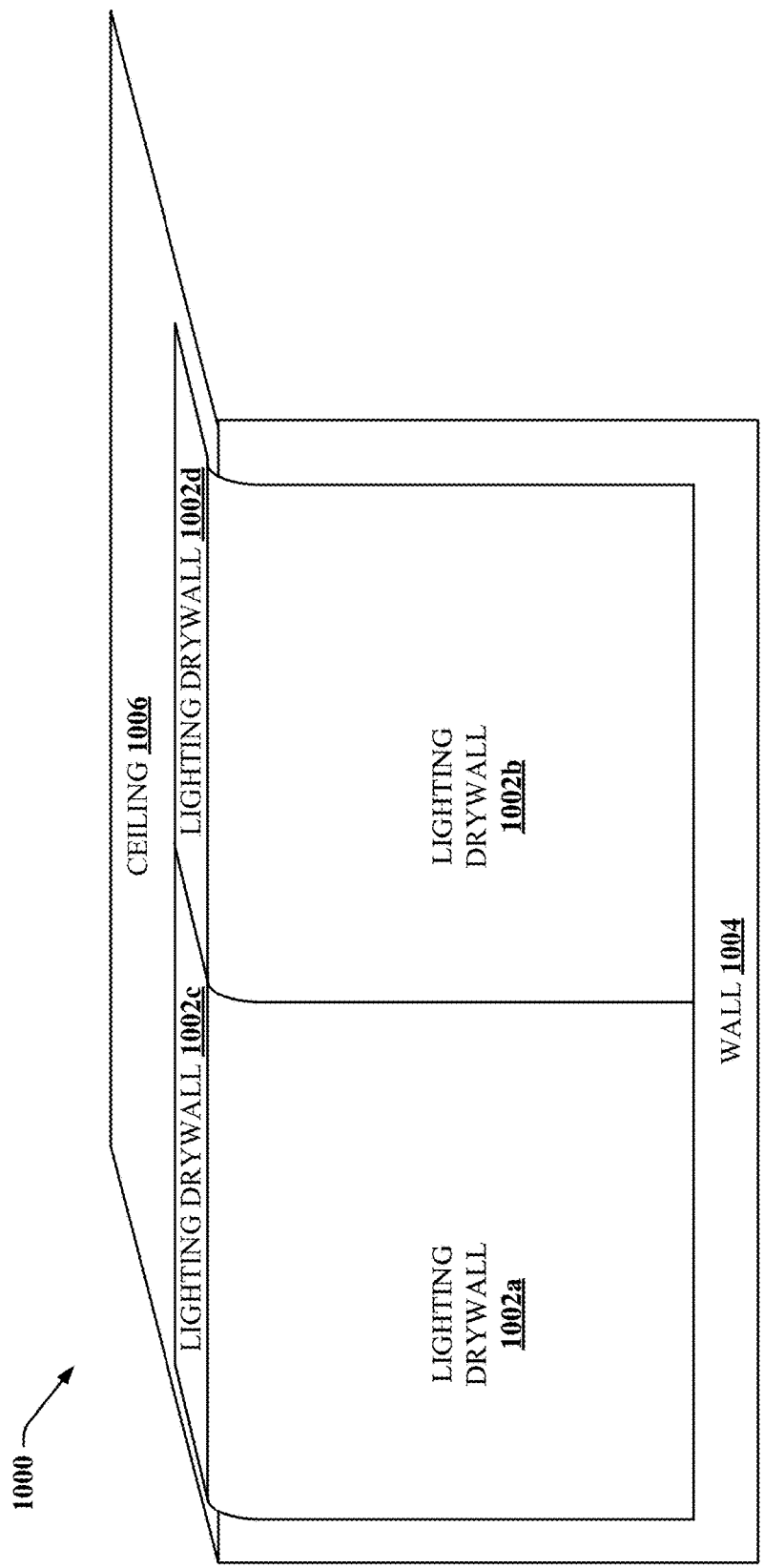
FIG. 10 illustrates a block diagram of an example, non-limiting environment in which lighting drywalls are installed in accordance with one or more embodiments described herein.

FIG. 10 illustrates a block diagram of an example, non-limiting environment 1000 which includes lighting drywall is installed in accordance with one or more embodiments described herein. Lighting drywalls 1002a, 1002b, 1002c, and 1002d can be lighting drywall 720, 722 as described above. Lighting drywalls 1002a and 1002b are installed along a wall 1004 while lighting drywalls 1002c and 1002d are installed on a ceiling 1006. In this example, lighting drywalls 1002a and 1002b have a curved upper end, and lighting drywalls 1002c and 1002d are installed as flat sheets. In this manner, lighting drywalls 1002a and 1002b provide a curved surface at the intersection of wall 1004 and ceiling 1006. Lighting drywalls 1002a, 1002b, 1002c, and 1002d are connected via connectors 602 such that meshes 402 within lighting drywalls 1002a, 1002b, 1002c, and 1002d can form a continuous mesh as described above.

Figure 11A:
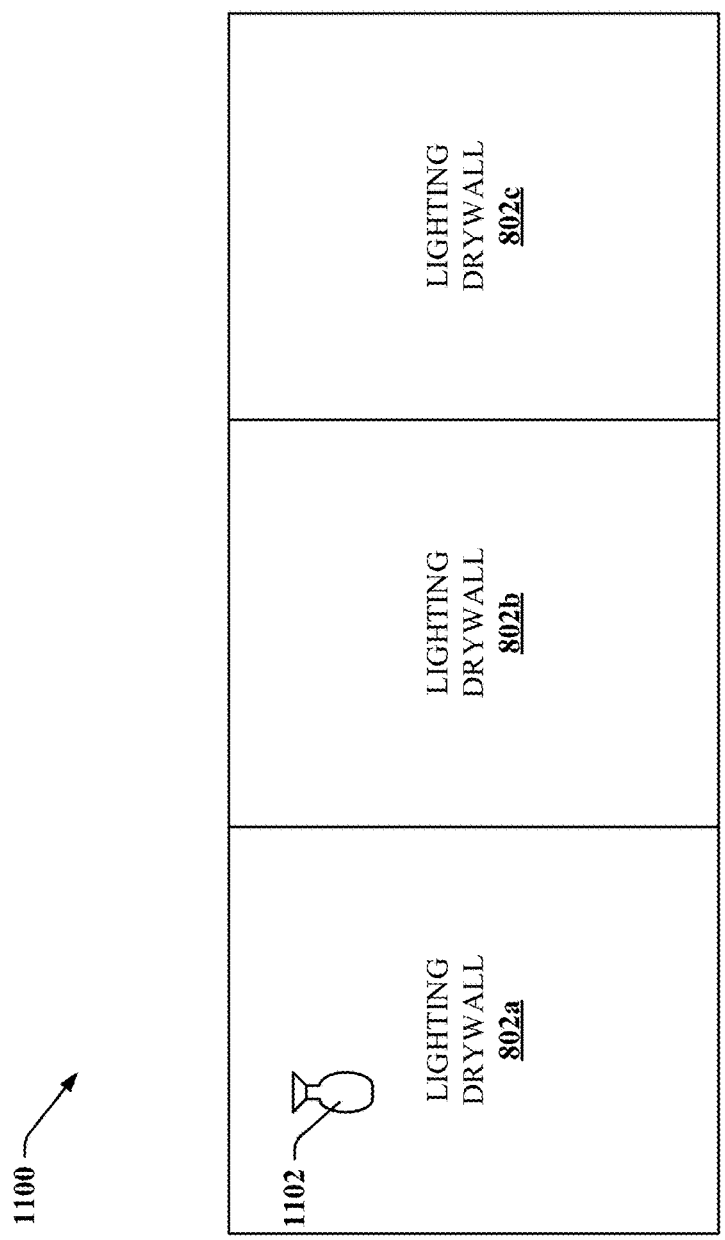
Figure 11C:
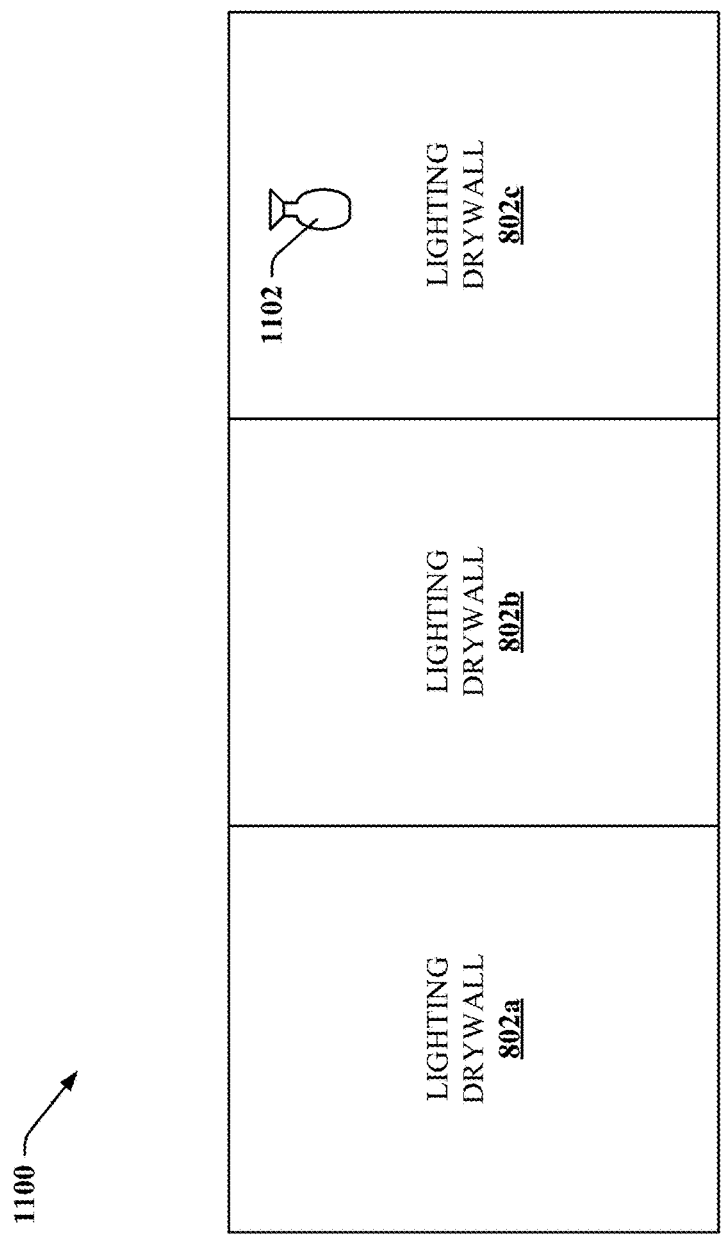

FIGS. 11A, 11B, and 11C illustrate a block diagram of an example, non-limiting environment 1100 which includes a smart light installed on lighting drywall 802a, 802b, and 802c of FIG. 8 in accordance with one or more embodiments described herein. Smart light 1102 can be smart light 702, 718 as described above. In FIG. 11A, smart light 1102 is installed (e.g. magnetically attached, attached via adhesive, or any other suitable removable attachable mechanism) on lighting drywall 802a and can receive power from lighting drywall 802a. For example, one or more magnets 120 in smart light 1102 can form a magnetic attraction to one or more magnets 504 in lighting drywall 802a, wherein the magnetic attraction is sufficient to support a weight of smart light 1102 to be mounted on lighting drywall 802a. The magnetic attraction can be sufficient to prevent smart light 1102 from detaching from lighting drywall 802a without user (e.g. human and/or robot) intervention. Additionally, the magnetic attraction can be such that a user can detach smart light 1102 from lighting drywall 802a with manual force (e.g. not requiring tools). Furthermore, smart light 1102 can communicate with lighting drywalls 802a, 802b, and 802c. In FIG. 11B, smart light 1102 has been detached from lighting drywall 802a and installed on lighting drywall 802b. Smart light 1102 can receive power from lighting drywall 802b and can communicate with lighting drywalls 802a, 802b, and 802c. In FIG. 11C, smart light 1102 has been detached from lighting drywall 802b and installed on lighting drywall 802c. Smart light 1102 can receive power from lighting drywall 802c and can communicate with lighting drywalls 802a, 802b, and 802c.

FIG. 12 illustrates a block diagram of an example, non-limiting environment 1200 which includes smart lights installed on lighting drywall of FIG. 10 in accordance with one or more embodiments described herein. Smart lights 1202a and 1202b can be smart light 702, 718 as described above. Smart light 1202a is installed on lighting drywall 1002a and can receive power from lighting drywall 1002a. Smart light 1202b is installed on lighting drywall 1002d and can receive power from lighting drywall 1002d. Smart lights 1202a and 1202b can communicate with each other and with lighting drywalls 1002a, 1002b, 1002c, and 1000d.

Figure 13B:
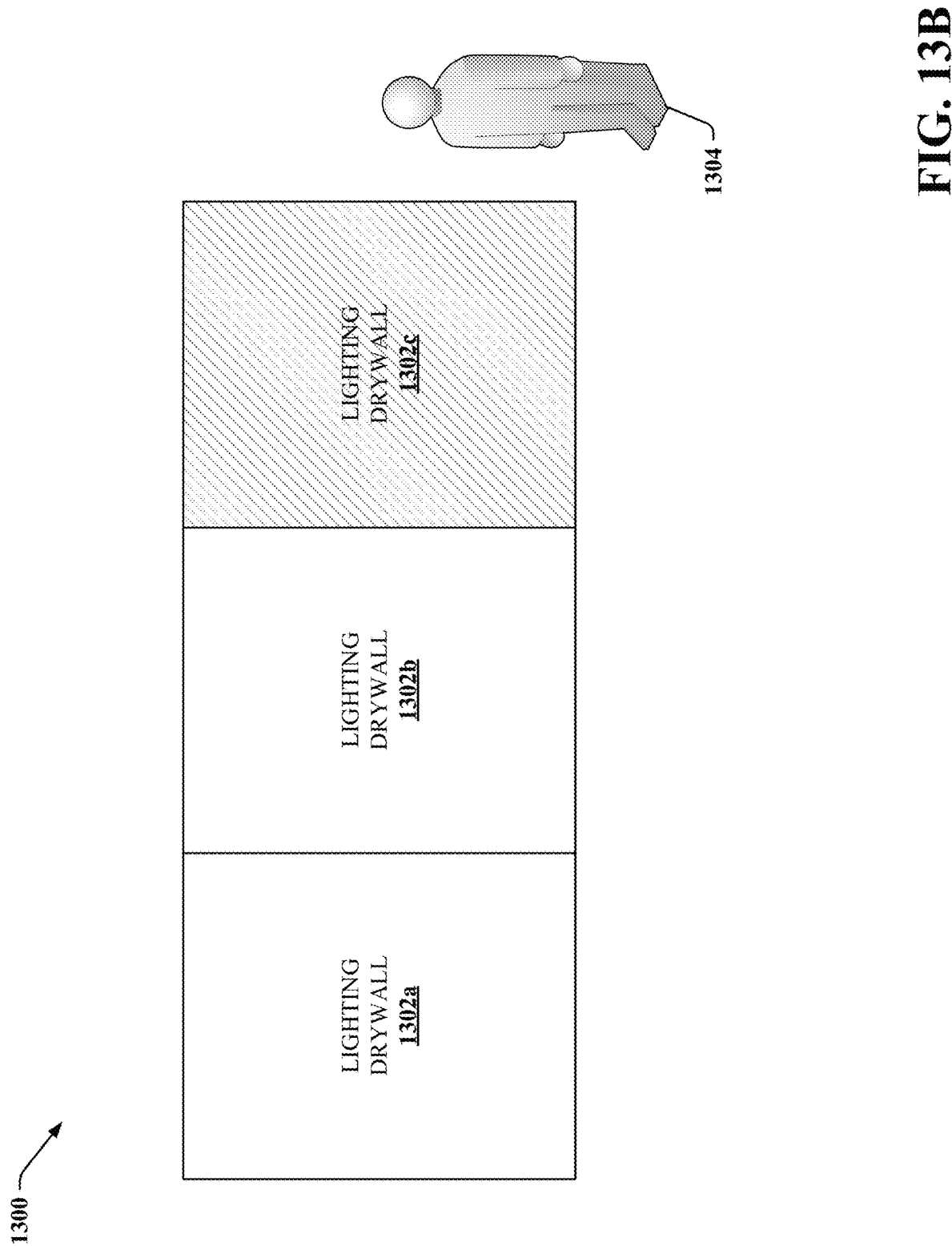
Figure 13C:
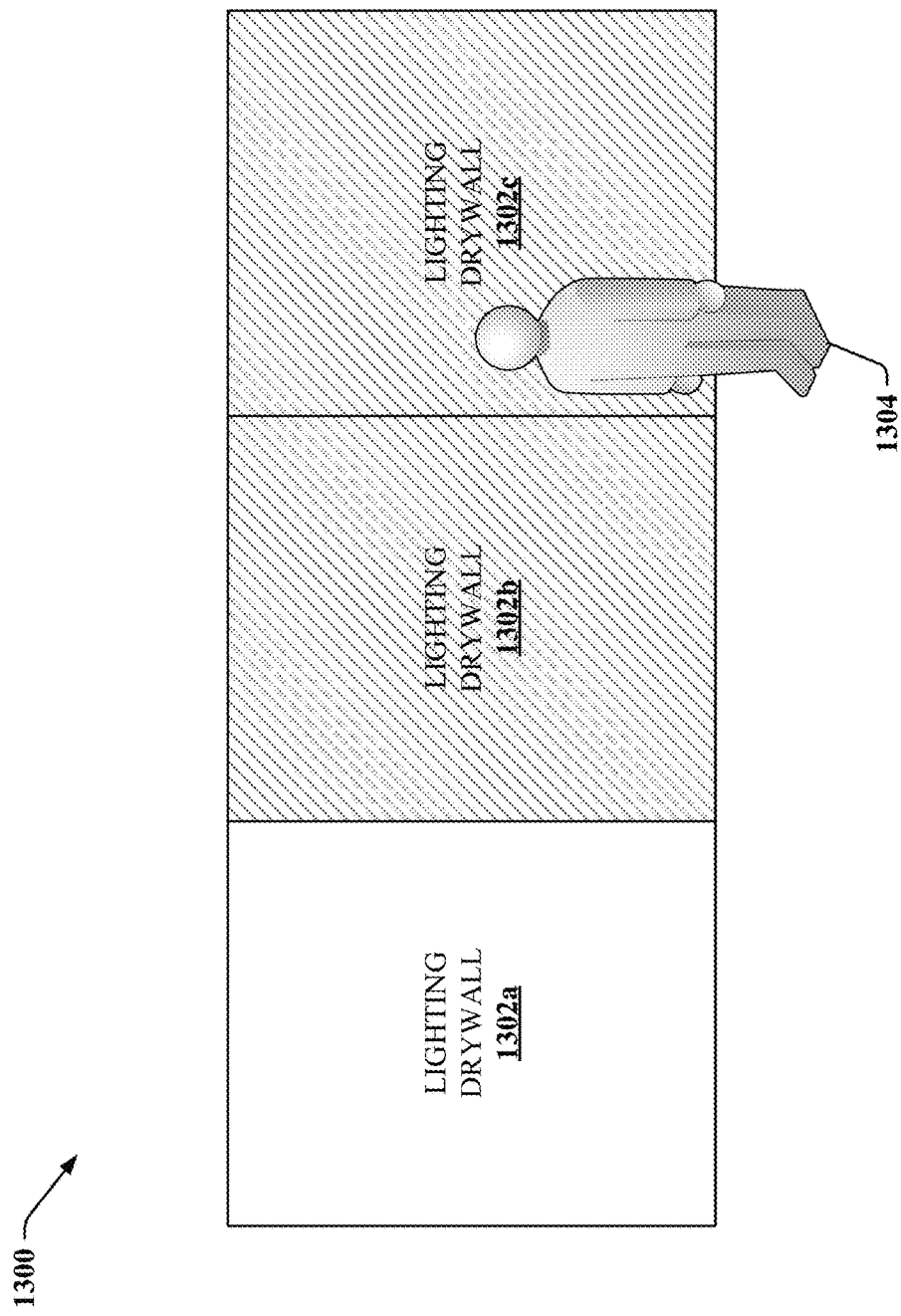
Figure 13D:
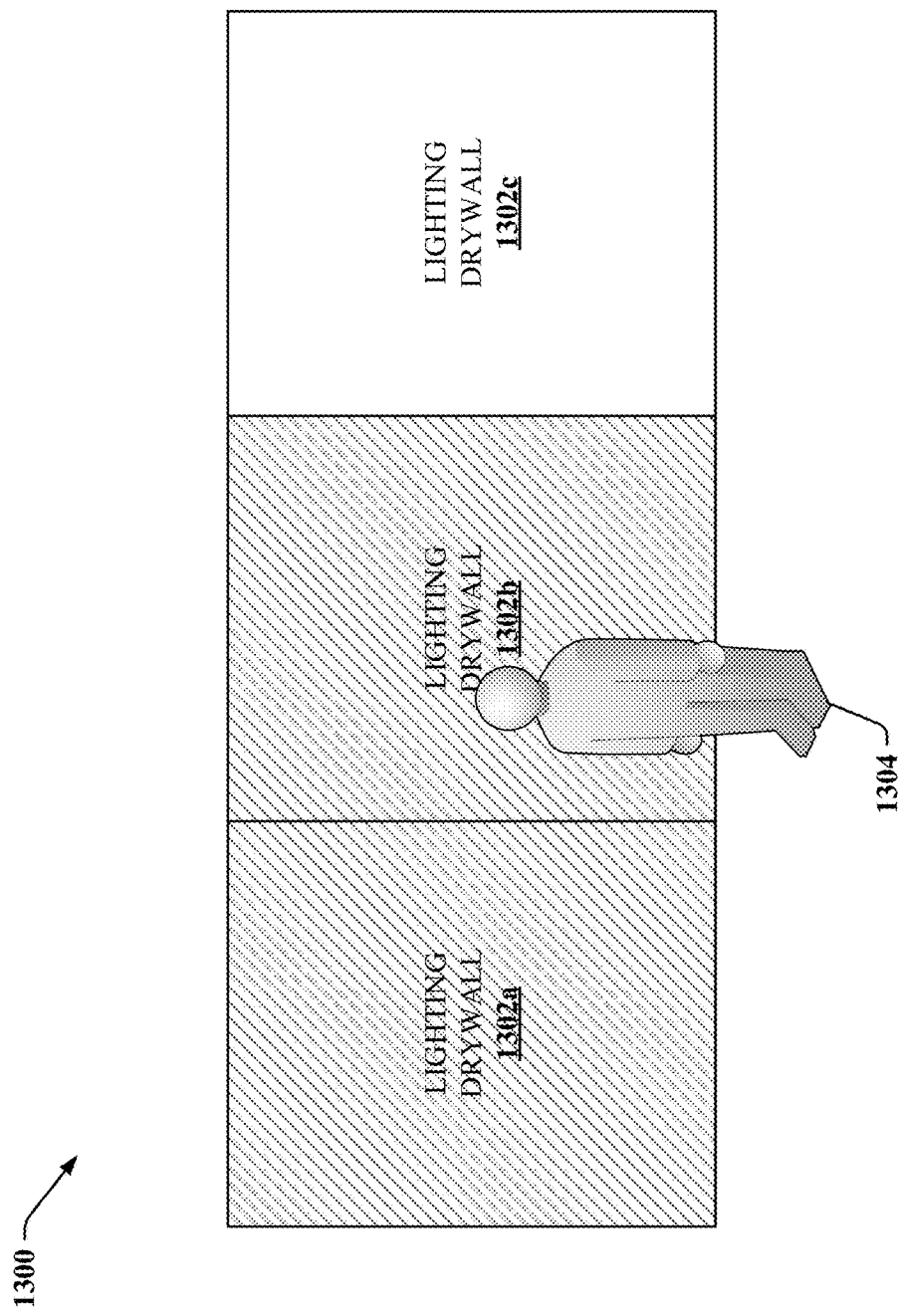
Figure 13E:
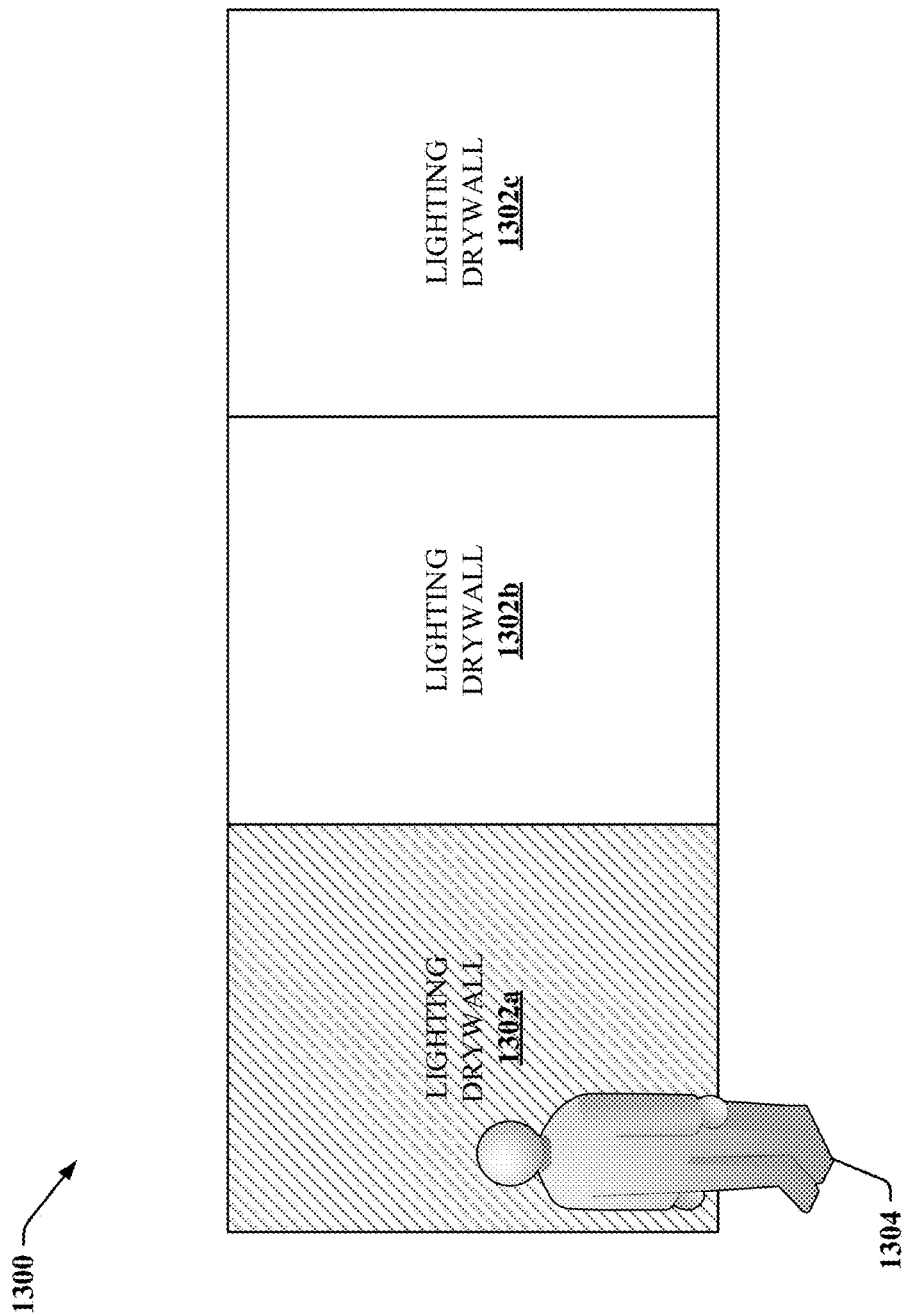

FIGS. 13A, 13B, 13C, and 13D illustrate a block diagram of an example, non-limiting environment 1300 which includes lighting drywall with an illuminated surface in accordance with one or more embodiments described herein. Lighting drywalls 1302a, 1302b, and 1302c can be lighting drywall 720, 722 as described above. FIG. 13A depicts lighting drywalls 1302a, 1302b, and 1302c that can have a surface that is a LED panel that is powered/controlled by the mesh 402. In this manner, light can be projected from any portion of the LED panel surfaces of lighting drywalls 1302a, 1302b, and 1302c as needed based on artificial intelligence control or user control. For example, as a person is walking, light projected from the walls can move with the user to keep a pathway in front of and/or around the user lit. FIG. 13B depicts user 1304 approaching (e.g. within a defined distance and/or range of the lighting drywall) lighting drywall 1302c which lights up in response to detecting user 1304. FIG. 13C depicts user 1304 approaching lighting drywall 1302b which lights up in response to detecting the approach of user 1304 or receiving instructions from lighting drywall 1302c. In this example, lighting drywall 1302c remains lit up since user 1304 is still within the defined distance and/or range of lighting drywall 1302c. FIG. 13D depicts user 1304 approaching lighting drywall 1302a which lights up in response to detecting the approach of user 1304 or receiving instructions from lighting drywall 1302b or 1302c. In this example, lighting drywall 1302c turns off its lighting since user 1304 is no longer within the defined distance and/or range of lighting drywall 1302c. FIG. 13E depicts user 1304 leaving lighting drywall 1302a which remains lit up since user 1304 is still within the defined distance and/or range of lighting drywall 1302a. In this example, lighting drywall 1302b turns off its lighting since user 1304 is no longer within the defined distance and/or range of lighting drywall 1302b.

Figure 14:
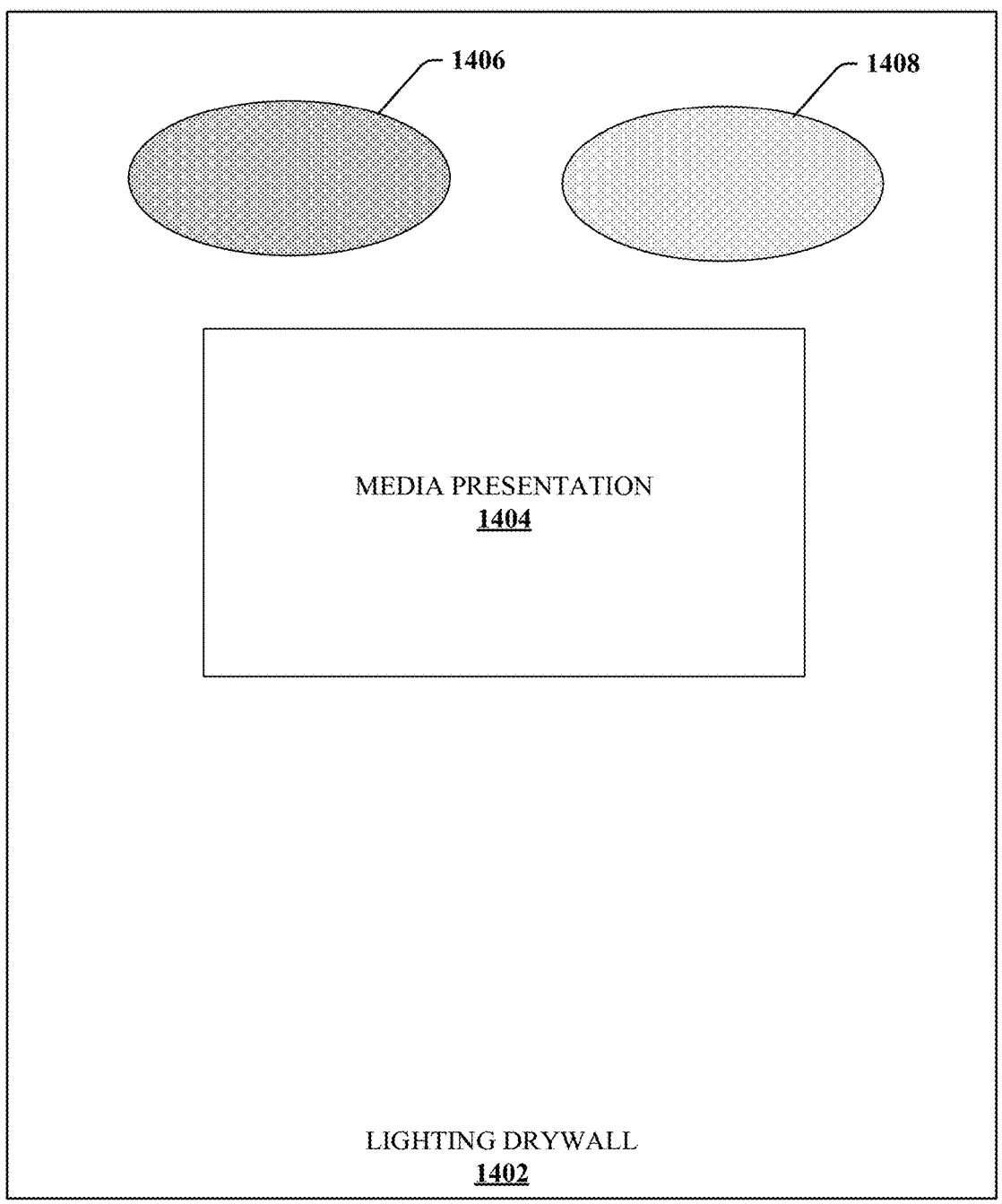
FIG. 14 illustrates a block diagram of an example, non-limiting environment in which lighting drywall is installed in accordance with one or more embodiments described herein.

FIG. 14 illustrates a block diagram of an example, non-limiting environment 1400 which includes lighting drywall with an media surface in accordance with one or more embodiments described herein. Lighting drywalls 1402 can be lighting drywall 720, 722 as described above. In an example, a portion of a lighting drywall in a room can display media content, while the remainder of the walls, ceilings, and/or floors project lighting coordinated with the media. Lighting drywall 1402 can have a surface that is capable of presenting media presentation 1404 and various lighting patterns. In this example, lighting drywall 1402 is presenting media presentation 1404 while concurrently presenting lighting patterns 1406 and 1408 that are coordinated with media presentation 1404. For example, media presentation 1404 can be a movie and the lighting patterns 1406 and 1408 can be coordinated with the content of the movie. While not depicted in this example, it is to be appreciated that multiple lighting drywall 1402 can act in coordination to present media content and lighting patterns in a coordinated manner. In another example, one or more lighting drywall 1402 in a room can present different content to different users in the room. For example, lighting drywall 1402 in a kitchen can present a recipe to a mom while concurrently presenting a cartoon to a child.

Figure 15:
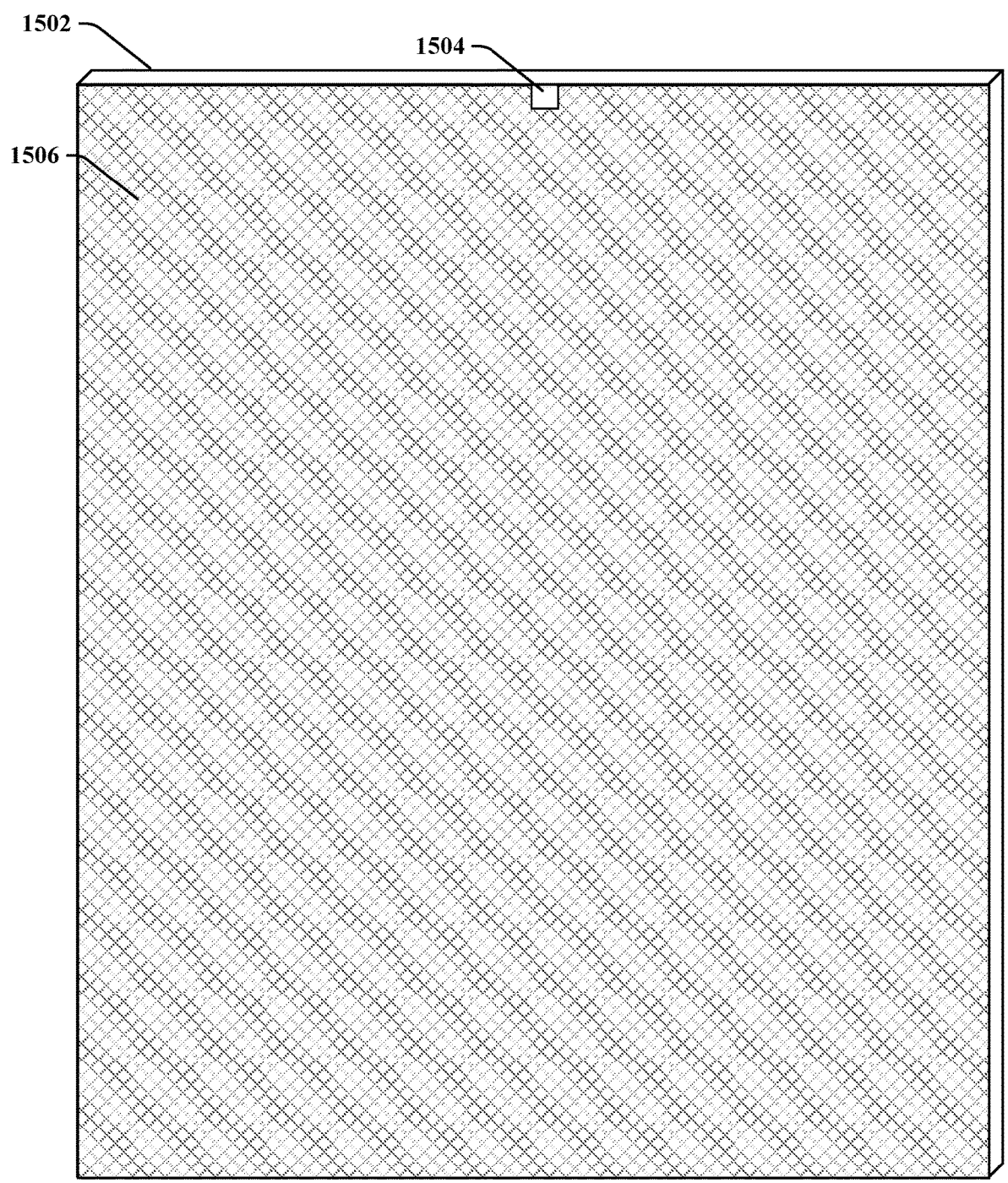
FIG. 15 illustrates a block diagram of an example, non-limiting lighting drywall in accordance with one or more embodiments described herein.

FIG. 15 illustrates a block diagram of an example, non-limiting lighting drywall 1502 in accordance with one or more embodiments described herein. Lighting drywalls 1502 can have one or more component and/or functionality of lighting drywall 720, 722 as described above. Lighting drywall 1502 can have one or more laser LEDs 1504 embedded therein and have a surface 1506 that acts as an optical waveguide for light projected from the one or more laser LEDs. A laser LED 1504 can have a very high light output such that a single laser LED 1504 can cause the entire lighting drywall surface 1506 to project light through the optical waveguide surface.

While FIG. 7 depicts separate components in smart light 702 and/or lighting drywall 722, it is to be appreciated that two or more components can be implemented in a common component. Further, it is to be appreciated that the design of the smart light 702 and/or lighting drywall 722 can include other component selections, component placements, etc., to facilitate determining characteristics of the environment in which the smart light 702 and/or lighting drywall 722 is installed, determining capabilities of smart light 702 and/or lighting drywall 722, determining one or more objectives of the installation of smart light 702 and/or lighting drywall 722, performing a self-configuration of smart light 702 and/or lighting drywall 722 according to the determined one or more objectives, and determining and executing suitable actions for smart light 702 and/or lighting drywall 722 to perform to achieve the determined one or more objectives in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to determining characteristics of the environment in which the smart light 702 and/or lighting drywall 722 is installed, determining capabilities of smart light 702 and/or lighting drywall 722, determining one or more objectives of the installation of smart light 702 and/or lighting drywall 722, performing a self-configuration of smart light 702 and/or lighting drywall 722 according to the determined one or more objectives, and determining and executing suitable actions for smart light 702 and/or lighting drywall 722 to perform to achieve the determined one or more objectives. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for determining characteristics of the environment in which the smart light 702 and/or lighting drywall 722 is installed, determining capabilities of smart light 702 and/or lighting drywall 722, determining one or more objectives of the installation of smart light 702 and/or lighting drywall 722, performing a self-configuration of smart light 702 and/or lighting drywall 722 according to the determined one or more objectives, and determining and executing suitable actions for smart light 702 and/or lighting drywall 722 to perform to achieve the determined one or more objectives by improving processing efficiency among processing components in these systems, reducing delay in processing performed by the processing components, reducing memory requirements, and/or improving the accuracy in which the processing systems are determining characteristics of the environment in which the smart light 702 and/or lighting drywall 722 is installed, determining capabilities of smart light 702 and/or lighting drywall 722, determining one or more objectives of the installation of smart light 702 and/or lighting drywall 722, performing a self-configuration of smart light 702 and/or lighting drywall 722 according to the determined one or more objectives, and determining and executing suitable actions for smart light 702 and/or lighting drywall 722 to perform to achieve the determined one or more objectives.

It is to be appreciated that the any criteria or thresholds disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 16:
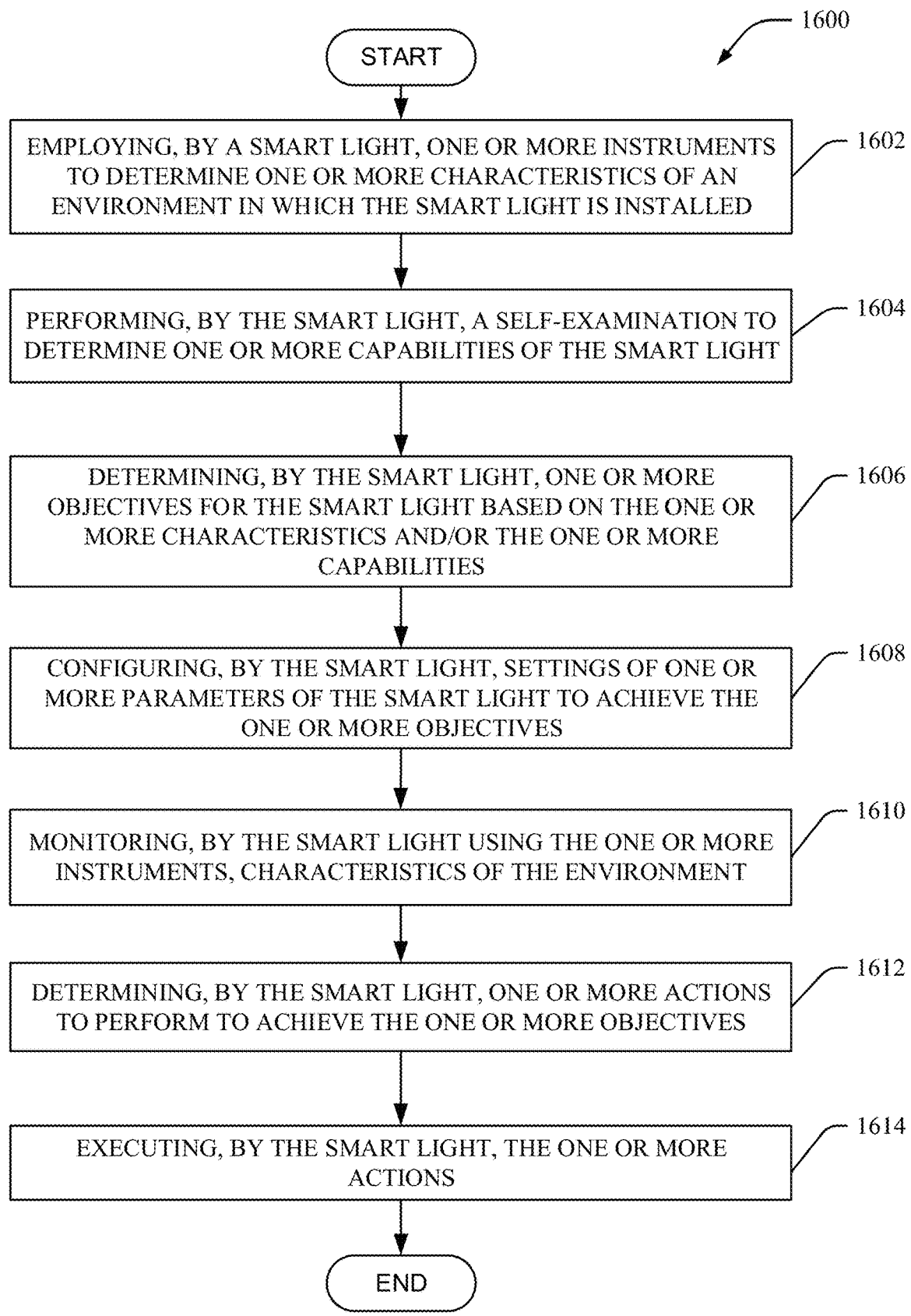
FIG. 16 illustrates a flow diagram of an example, non-limiting computer-implemented method in accordance with one or more embodiments described herein.

FIG. 16 illustrates a flow diagram of an example, non-limiting computer-implemented method 1600 in accordance with one or more embodiments described herein. Repetitive description of like elements employed in other embodiments described herein is omitted for sake of brevity.

At 1602, method 1600 comprises employing, by a smart light, one or more instruments to determine one or more characteristics of an environment in which the smart light is installed (e.g., via smart light controller component 704 and/or smart light 702). At 1604, method 1600 comprises performing, by the smart light, a self-examination to determine one or more capabilities of the smart light (e.g., via smart light controller component 704 and/or smart light 702). At 1606, method 1600 comprises determining, by the smart light, one or more objectives for the smart light based on the one or more characteristics and/or the one or more capabilities (e.g., via smart light controller component 704 and/or smart light 702). At 1608, method 1600 comprises configuring, by the smart light, settings of one or more parameters of the smart light to achieve the one or more objectives (e.g., via smart light controller component 704 and/or smart light 702). At 1610, method 1600 comprises monitoring, by the smart light using the one or more instruments, characteristics of the environment (e.g., via smart light controller component 704 and/or smart light 702). At 1612, method 1600 comprises determining, by the smart light, one or more actions to perform to achieve the one or more objectives (e.g., via smart light controller component 704 and/or smart light 702). At 1614, method 1600 comprises executing, by the smart light, the one or more actions (e.g., via smart light controller component 704 and/or smart light 702).

Figure 17:
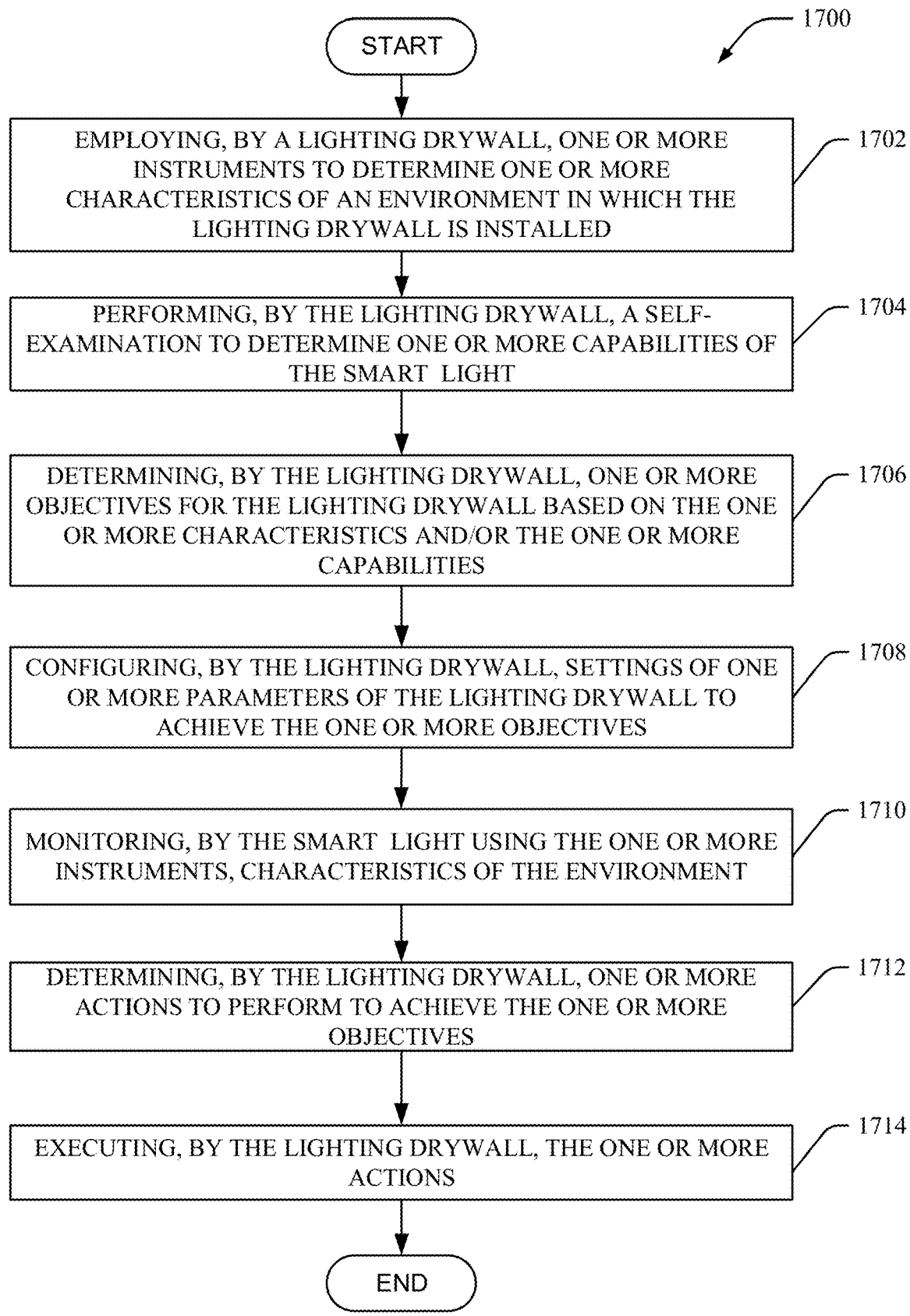
FIG. 17 illustrates a flow diagram of an example, non-limiting computer-implemented method in accordance with one or more embodiments described herein.

FIG. 17 illustrates a flow diagram of an example, non-limiting computer-implemented method 1700 in accordance with one or more embodiments described herein. Repetitive description of like elements employed in other embodiments described herein is omitted for sake of brevity.

At 1702, method 1700 comprises employing, by a lighting drywall, one or more instruments to determine one or more characteristics of an environment in which the lighting drywall is installed (e.g., via drywall controller component 724 and/or lighting drywall 722). At 1704, method 1700 comprises performing, by the lighting drywall, a self-examination to determine one or more capabilities of the lighting drywall (e.g., via drywall controller component 724 and/or lighting drywall 722). At 1706, method 1700 comprises determining, by the lighting drywall, one or more objectives for the lighting drywall based on the one or more characteristics and/or the one or more capabilities (e.g., via drywall controller component 724 and/or lighting drywall 722). At 1708, method 1700 comprises configuring, by the lighting drywall, settings of one or more parameters of the lighting drywall to achieve the one or more objectives (e.g., via drywall controller component 724 and/or lighting drywall 722). At 1710, method 1700 comprises monitoring, by the lighting drywall using the one or more instruments, characteristics of the environment (e.g., via drywall controller component 724 and/or lighting drywall 722). At 1712, method 1700 comprises determining, by the lighting drywall, one or more actions to perform to achieve the one or more objectives (e.g., via drywall controller component 724 and/or lighting drywall 722). At 1714, method 1700 comprises executing, by the lighting drywall, the one or more actions (e.g., via drywall controller component 724 and/or lighting drywall 722).

Figure 18:
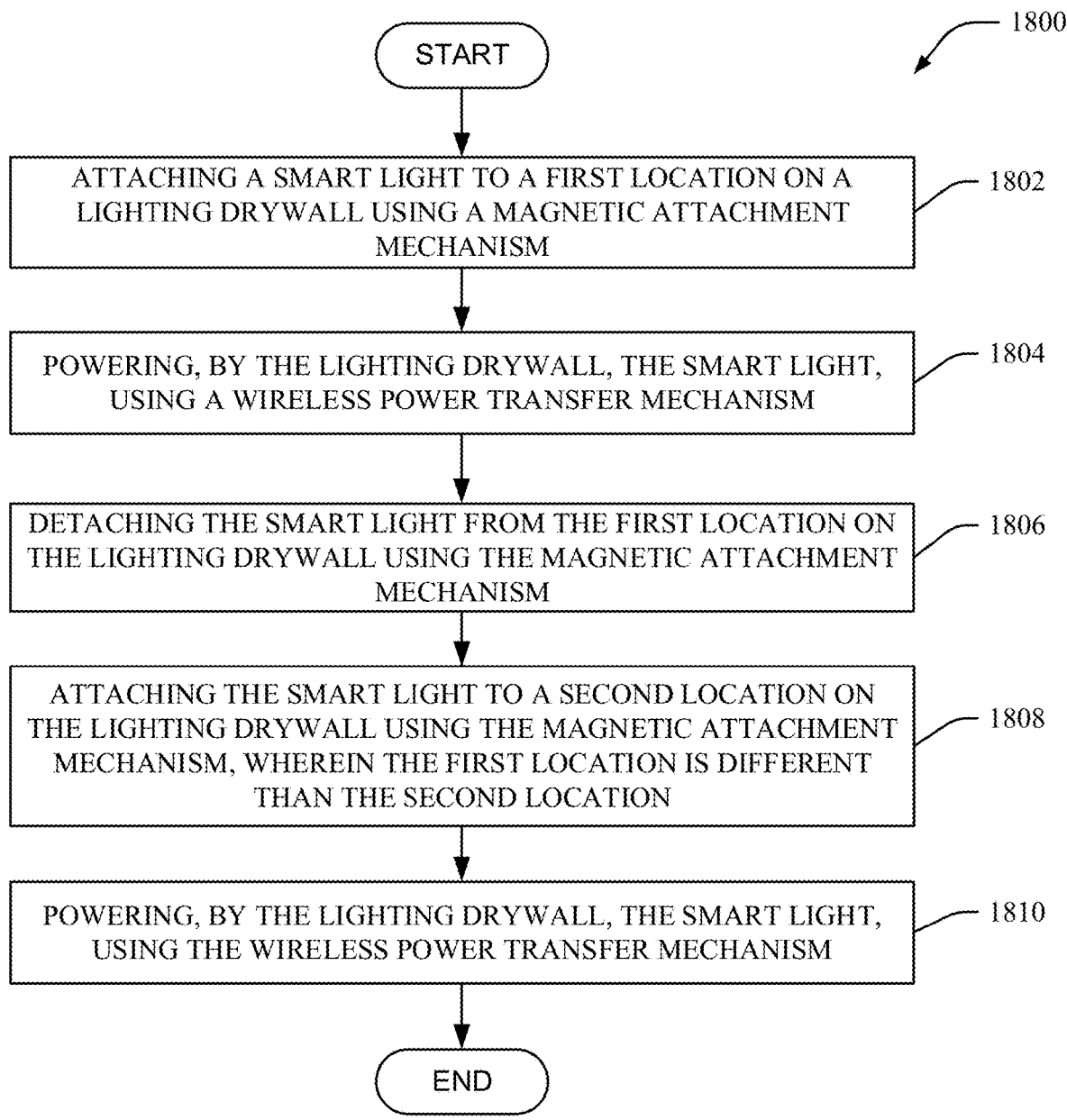
FIG. 18 illustrates a flow diagram of an example, non-limiting computer-implemented method in accordance with one or more embodiments described herein.

FIG. 18 illustrates a flow diagram of an example, non-limiting computer-implemented method 1800 in accordance with one or more embodiments described herein. Repetitive description of like elements employed in other embodiments described herein is omitted for sake of brevity.

At 1802, method 1800 comprises attaching a smart light to a first location on a lighting drywall using a magnetic attachment mechanism (e.g., via smart light controller component 704, smart light 702, drywall controller component 724, and/or lighting drywall 722). At 1804, method 1800 comprises powering, by the lighting drywall, the smart light, using a wireless power transfer mechanism (e.g., via smart light controller component 704, smart light 702, drywall controller component 724, and/or lighting drywall 722). At 1806, method 1800 comprises detaching the smart light from the first location on the lighting drywall using the magnetic attachment mechanism (e.g., via smart light controller component 704, smart light 702, drywall controller component 724, and/or lighting drywall 722). At 1808, method 1800 comprises attaching the smart light to a second location on the lighting drywall using the magnetic attachment mechanism, wherein the first location is different than the second location (e.g., via smart light controller component 704, smart light 702, drywall controller component 724, and/or lighting drywall 722). At 1810, method 1800 comprises powering, by the lighting drywall, the smart light, using the wireless power transfer mechanism (e.g., via smart light controller component 704, smart light 702, drywall controller component 724, and/or lighting drywall 722).

Figure 19:
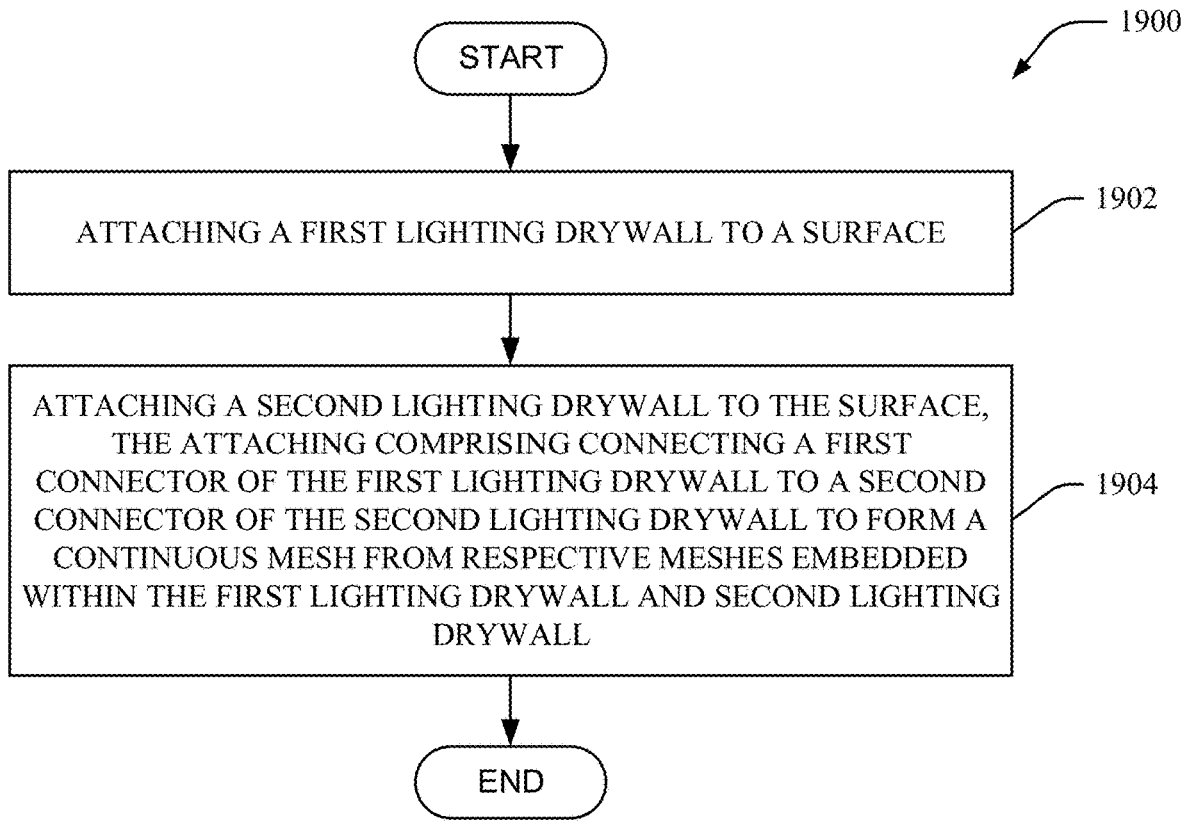
FIG. 19 illustrates a flow diagram of an example, non-limiting computer-implemented method in accordance with one or more embodiments described herein.

FIG. 19 illustrates a flow diagram of an example, non-limiting computer-implemented method 1900 in accordance with one or more embodiments described herein. Repetitive description of like elements employed in other embodiments described herein is omitted for sake of brevity.

At 1902, method 1900 comprises attaching a first lighting drywall to a surface (e.g., via drywall controller component 724 and/or lighting drywall 722). At 1904, method 1900 comprises attaching a second lighting drywall to the surface, the attaching comprising connecting a first connector of the first lighting drywall to a second connector of the second lighting drywall to form a continuous mesh from respective meshes embedded within the first lighting drywall and second lighting drywall (e.g., via drywall controller component 724 and/or lighting drywall 722).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 20:
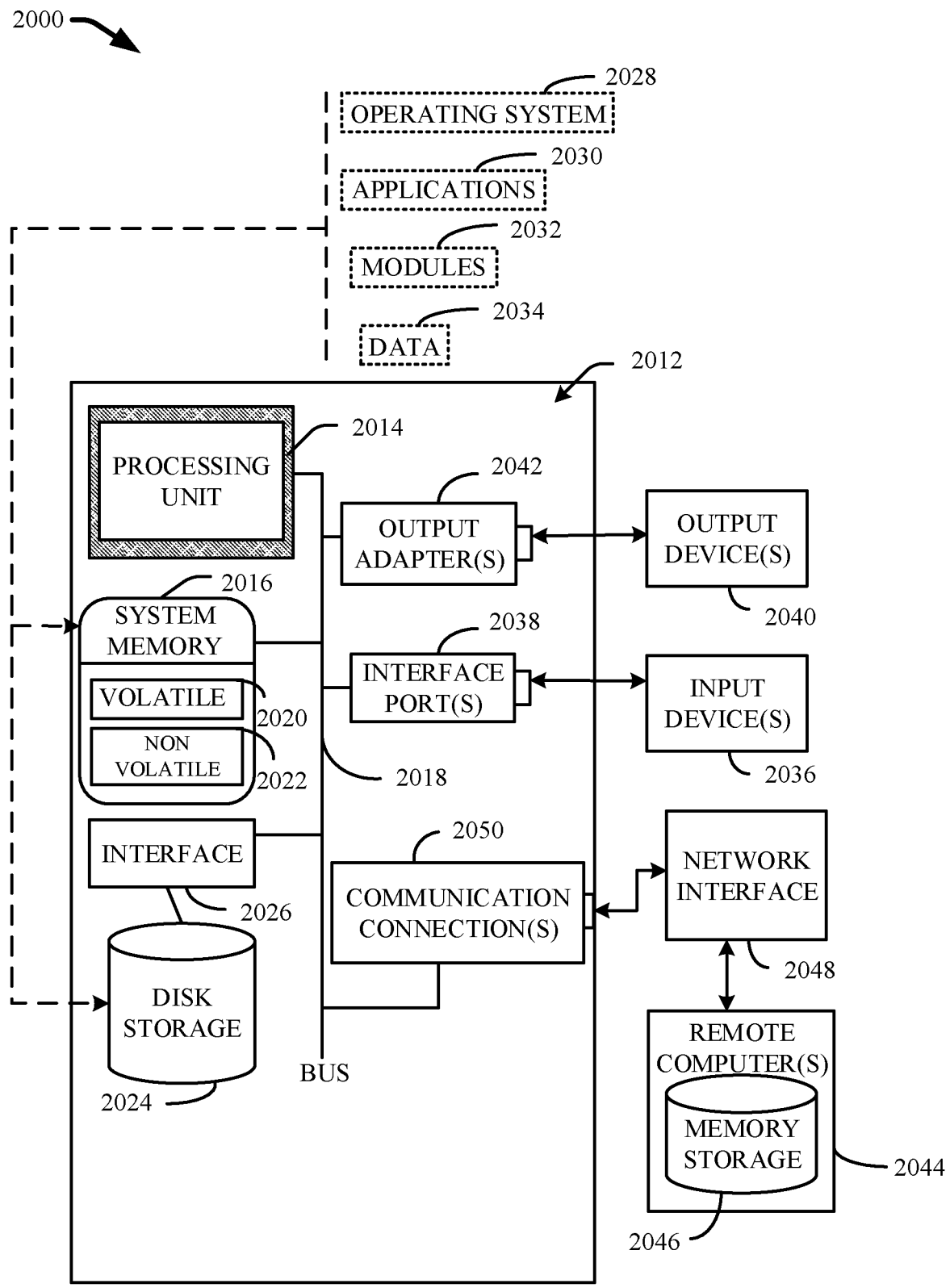
FIG. 20 illustrates a block diagram of an example, non-limiting operating environment in which one or more embodiments described herein can be facilitated.

In order to provide a context for the various aspects of the disclosed subject matter, FIG. 20 as well as the following discussion are intended to provide a general description of a suitable environment in which the various aspects of the disclosed subject matter can be implemented. FIG. 20 illustrates a block diagram of an example, non-limiting operating environment in which one or more embodiments described herein can be facilitated. Repetitive description of like elements employed in other embodiments described herein is omitted for sake of brevity.

With reference to FIG. 20, a suitable operating environment 2000 for implementing various aspects of this disclosure can also include a computer 2012. The computer 2012 can also include a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014. The system bus 2018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 2016 can also include volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 2020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2012 can also include removable/non-removable, volatile/nonvolatile computer storage media. FIG. 20 illustrates, for example, a disk storage 2024. Disk storage 2024 can also include, but is not limited to, devices like a magnetic disk drive, floppy disk drive, tape drive, Jaz drive, Zip drive, LS-100 drive, flash memory card, or memory stick. The disk storage 2024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2024 to the system bus 2018, a removable or non-removable interface is typically used, such as interface 2026. FIG. 20 also depicts software that acts as an intermediary between users and the basic computer resources described in the suitable operating environment 2000. Such software can also include, for example, an operating system 2028. Operating system 2028, which can be stored on disk storage 2024, acts to control and allocate resources of the computer 2012. System applications 2030 take advantage of the management of resources by operating system 2028 through program modules 2032 and program data 2034, e.g., stored either in system memory 2016 or on disk storage 2024. It is to be appreciated that this disclosure can be implemented with various operating systems or combinations of operating systems. A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port can be used to provide input to computer 2012, and to output information from computer 2012 to an output device 2040. Output adapter 2042 is provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a computer, a server, a router, a network PC, a workstation, a microprocessor based appliance, a peer device or other common network node and the like, and typically can also include many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2050 refers to the hardware/software employed to connect the network interface 2048 to the system bus 2018. While communication connection 2050 is shown for illustrative clarity inside computer 2012, it can also be external to computer 2012. The hardware/software for connection to the network interface 2048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A lighting drywall sheet comprising:
    a power source; and
    a mesh configured to provide power from the power source to a device attached to a surface of the lighting drywall sheet using a wireless power transfer mechanism, wherein at least a portion of the surface of the lighting drywall sheet is a media surface configured to display media content.

2. The lighting drywall sheet of claim 1, wherein the lighting drywall sheet is configured to physically connect to at least one other lighting drywall sheet, and electrically connect the mesh with at least one other mesh of the at least one other lighting drywall sheet to form a continuous mesh.

3. The lighting drywall sheet of claim 1, further comprising:
    at least one component configured to provide a magnetic attachment to the device.

4. The lighting drywall sheet of claim 3, wherein the at least one component is at least one magnet embedded within the lighting drywall sheet.

5. The lighting drywall sheet of claim 3, wherein the at least one component is the surface of the lighting drywall sheet that provides the magnetic attachment to at least one magnet of the device.

6. The lighting drywall sheet of claim 3, wherein the at least one component is configured to enable:
    attachment of the device at a first location on the lighting drywall sheet and provide the power to the device;
    removal of the device from the first location on the lighting drywall sheet; and
    attachment of the device at a second location on the lighting drywall sheet and provide the power to the device.

7. The lighting drywall sheet of claim 1, wherein the device is a smart light.

8. The lighting drywall sheet of claim 1, further comprising:
    one or more instruments;
    a memory that stores computer executable components; and
    a processor that executes the computer executable components stored in the memory, wherein the computer executable components comprise:
        a drywall controller component configured to employ the one or more instruments to control an operation of the device.

9. The lighting drywall sheet of claim 8, wherein the drywall controller component is further configured to:
    employ the one or more instruments to determine one or more characteristics of an environment in which lighting drywall sheet is installed;
    generate one or more objectives for the lighting drywall sheet based on the one or more characteristics and one or more capabilities of the lighting drywall sheet; and
    configure at least one setting of at least one parameter of the lighting drywall sheet to achieve the one or more objectives.

10. The lighting drywall sheet of claim 9, wherein the drywall controller component is further configured to:
    monitor the one or more characteristics of the environment using the one or more instruments;
    determine one or more actions to perform to achieve the one or more objectives;
    execute the one or more actions.

11. The lighting drywall sheet of claim 10, wherein the one or more actions comprises coordination with at least one other lighting drywall sheet to execute the one or more actions.

12. The lighting drywall sheet of claim 1, further comprising:
    a laser light emitting diode (LED); and
    a surface configured as an optical waveguide for light projected from the laser LED to enable illumination of an entirety of the surface.

13. A system comprising:
    a smart light comprising at least one light bulb; and
    a lighting drywall sheet comprising:
        a power source, and
        a mesh configured to provide power from the power source using a wireless power transfer mechanism; and
    wherein the smart light is removably attachable to a plurality of locations on the lighting drywall sheet and configured to receive the power using the wireless power transfer mechanism at respective locations of the plurality of locations, and
    wherein at least a portion of a surface of the lighting drywall sheet is a media surface configured to display media content.

14. The system of claim 13, wherein the lighting drywall sheet is configured to physically connect to at least one other lighting drywall sheet, and electrically connect the mesh with at least one other mesh of the at least one other lighting drywall sheet to form a continuous mesh.

15. The system of claim 13, wherein:
    the smart light further comprises a smart light controller component configured to control operations of the smart light; and
    the lighting drywall sheet further comprises a drywall controller component configured to control operations of the lighting drywall sheet.

16. The system of claim 15, wherein the smart light controller component and drywall controller component are further configured to communicate with each other using the mesh.

17. The system of claim 15, wherein the smart light controller component and drywall controller component are further configured to coordinate their respective operations.

18. The system of claim 15, wherein the drywall controller component is further configured to:
    monitor the one or more characteristics of an environment using one or more instruments;

determine one or more actions to perform to achieve the one or more objectives;
execute the one or more actions.

19. A method comprising:
attaching, via a magnetic attachment mechanism, a smart light to a first location on a lighting drywall sheet;
powering, via a mesh embedded within the lighting drywall sheet, the smart light at the first location using a wireless power transfer mechanism; and
displaying, via at least a portion of a surface of the lighting drywall sheet that is a media surface, media content.

20. The method of claim 19, further comprising;
detaching, via the magnetic attachment mechanism, the smart light from the first location of the lighting drywall sheet;
attaching, via the magnetic attachment mechanism, the smart light to a second location on the lighting drywall sheet;
powering, via the mesh, the smart light at the second location using the wireless power transfer mechanism.

\* \* \* \* \*